(12) United States Patent
Faibish et al.

(10) Patent No.: US 7,873,619 B1
(45) Date of Patent: Jan. 18, 2011

(54) MANAGING METADATA

(75) Inventors: Sorin Faibish, Newton, MA (US); Peter Bixby, Westborough, MA (US); Uday K. Gupta, Westford, MA (US); Walter A. O'Brien, III, Westborough, MA (US); Stephen A. Fridella, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 485 days.

(21) Appl. No.: 12/058,981

(22) Filed: Mar. 31, 2008

(51) Int. Cl.
*G06F 17/30* (2006.01)
(52) U.S. Cl. ...................... 707/705; 707/823
(58) Field of Classification Search .................. 707/823, 707/831, 705, 802
See application file for complete search history.

(56) References Cited

U.S. PATENT DOCUMENTS

| 5,802,553 | A * | 9/1998 | Robinson et al. | 711/103 |
| 7,149,846 | B2 * | 12/2006 | Hetrick | 711/114 |
| 2007/0094445 | A1 * | 4/2007 | Trika et al. | 711/113 |
| 2008/0177954 | A1 * | 7/2008 | Lee | 711/154 |

* cited by examiner

*Primary Examiner*—Cheryl Lewis
(74) *Attorney, Agent, or Firm*—Krishnendu Gupta; Jason A. Reyes; Phillip W. Citroen

(57) ABSTRACT

A method is used in managing metadata. Data of an object is stored in a magnetic hard disk set in an object addressable data storage system. Metadata for the object is stored in an SSD set in the object addressable data storage system. The metadata includes information necessary for determining the location of the data of the object in the magnetic hard disk set.

19 Claims, 11 Drawing Sheets

MANAGING METADATA

FIELD OF THE INVENTION

The present invention relates to managing metadata.

BACKGROUND OF THE INVENTION

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

Some OAS systems employ file systems to manage storage of objects on one or more storage devices. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an inode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an inode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

As mentioned above, some OAS systems may store content in a file system. FIG. 1 shows an example of such an OAS system 1010 that includes an OAS interface 1030, a file system 1050, and one or more storage devices 1070. When OAS Interface 1030 receives a request (e.g., from an application program) to store a content unit, the OAS Interface may assign an object identifier to the content unit (which may be generated either by the OAS system, the entity that issued the request, or some other entity), and may issue a request to file system 1050 to store the content unit in one or more files. The file system may store the content unit on physical storage device(s) 1070, and may store metadata associating the file(s) in which the content of the content unit is stored with the physical location(s) of the content on the physical storage device(s).

When a request to access the content unit (that identifies the content unit using its object identifier) is subsequently received by OAS Interface 1030, the OAS Interface determines the file or files in file system 1050 that logically store the content of the content unit in any suitable way.

In some OAS systems, when the OAS Interface receives a request to store a content unit and stores the content unit in one or more files in the file system, the OAS Interface may store metadata that associates the object identifier for the content unit with the filename(s) and/or file system location(s) of the file. The OAS Interface may use this metadata to determine the file(s) that store the content of the content unit. In some OAS systems, when the OAS Interface, in response to a request to store a content unit, stores the content of the content unit in one or more file(s) in the file system, the OAS Interface may instruct the file system to give the one or more file(s) a file name that includes all or a portion of the object identifier for the content unit. When a subsequent access request for the content unit (that identifies the content unit using its object identifier) is received, the OAS Interface may determine the file(s) that store the content of the content unit by locating the file(s) that have the object identifier (or a portion thereof) in their filename.

Once the OAS Interface determines the file(s) in file system 1050 that store(s) the content of the content unit, the OAS Interface made send a request to the file system to access the file(s). In response, the file system may determine the physical storage location(s) of the content unit on the physical storage device(s), and request the content stored and the determined physical storage location(s) from the physical storage device. Upon receiving the requested content, the file system may return the content to the OAS Interface, which may return it to the requesting entity.

The simplified block diagram of OAS system 1010 shows file system 1050 directly accessing storage device(s) 1070. However, this is provided merely as a simplified example, as file system 1050 may access the storage device(s) in any suitable way. For example, in some embodiments file system 1050 may access the storage device(s) via a device driver that provides an interface to the storage device(s) or via an operating system that interfaces with the device driver for the storage device(s).

A major requirement of storage systems is the transfer and retrieval of data without error. Thus, storage systems and storage array controllers employ error detection and recovery techniques to ensure data integrity.

One such technique is to provide a "mirror" for each storage device. In a mirror arrangement, data are written to at least two storage devices. Thus, data may be read from either of the two storage devices so long as the two devices are operational and contain the same data. That is, either of the two storage devices may process read requests so long as the two devices are in synchronization. When one of the storage devices fails, its mirror may be used to continue processing read and write requests.

RAID parity schemes may be utilized to provide error detection during the transfer and retrieval of data across a storage system.

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems except that the entire stripe across all disks is always written together and is usually read as one; this argues for large, well formed writes and reads. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, in a four disk RAID 1+0 system, the first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a logical volume is configured so that its data is written across multiple disk drives in the striping technique, the logical volume is operating in RAID-0 mode. Alternatively, if the logical volume's parity information is stored on one disk drive and its data is striped across multiple other disk drives, the logical volume is operating in RAID-4 mode. If both data and parity information are striped across multiple disk drives, the logical volume is operating in RAID-5 mode.

In addition to RAID parity schemes, a storage array controller may utilize an error and detection code to provide additional path and/or drive anomaly protection. Data path and drive anomaly protection schemes typically employ metadata that is stored on disk drives along with user data. This may require that the metadata is managed on a per input/output (I/O) basis. Further, each time user data is read from or written to media, the accompanying metadata must also be read from or written to media.

An approach known to the art for managing metadata involves interleaving metadata with the user data utilizing a 512-byte sector format. Generally, metadata is interleaved with the user data at fixed intervals, for example, a segment of user data may be followed by a sector of metadata. Typically, the size of the user data block in each interval matches the size of the cache block used to manage a storage controller's data cache. This allows the user data and the metadata for a given cache block to be picked up with a single read directed to that cache block.

In general, as a device for improving performance, a cache can copy the data from lower-speed storage devices (e.g., disks) to higher-speed storage devices (e.g., fast memories) to perform writing or reading commands so as to speed up the responses of systems.

The caching operation is basically deployed by using higher-speed storage devices in which retains a copy of data copied from lower-speed storage devices to allow readings or writings performed first on the higher-speed storage devices when it is required to read or write data from the lower-speed storage devices, and thus to speed up the responses of systems.

For example, a random access memory (RAM), which constitutes the main memory of a computer system, is running much faster than a disk so that the RAM memory can be partly used to be a cache of the disk. While reading the data of the disk, a copy of the read data will be stored in the cache. If the system repeats requests to read or write the same data or sectors which are already stored on the cache, the system can directly execute reading or writing actions on the cache memory instead. This method can improve the accessing speed of the system.

For example, regarding a storage system, a cache is also able to be used with the storage system's file systems to improve the overall performance of the system.

In general, the term "file system" refers to the system designed to provide computer application programs with access to data stored on storage devices in a logical, coherent way. File systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices, i.e., collections of data blocks, each for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

File systems often utilize the services of operating system memory caches known as buffer caches and page caches. These caches generally consist of system memory buffers stored in volatile, solid-state memory of the computer. In this context, caching is a technique to speed up data requests from application programs by saving frequently accessed data in memory for quick recall by the file system without having to physically retrieve the data from the storage devices. Caching is also useful during file writes; the file system may write data to the memory cache and return control to the application before the data is actually written to non-volatile storage. Eventually, the cached data is written to the storage devices.

The state of the cache depends upon the consistency between the cache and the storage devices. A cache is "clean" when its contents are exactly the same as the data stored on the underlying storage devices. A cache is "dirty" when its data is newer than the data stored on storage devices; a cache becomes dirty when the file system has written to the cache, but the data has not yet been written to the storage devices. A cache is "stale" when its contents are older than data stored on the storage devices; a cache becomes stale when it has not been updated to reflect changes to the data stored on the storage devices.

In order to maintain consistency between the caches and the storage devices, file systems perform "flush" and "invalidate" operations on cached data. A flush operation writes dirty cached data to the storage devices before returning control to the caller. An invalidation operation removes stale data from the cache without invoking calls to the storage devices. File systems may flush or invalidate caches for specific byte-ranges of the cached files.

Many file systems utilize data structures mentioned above called inodes to store information specific to each file. Copies of these data structures are maintained in memory and within the storage devices. Inodes contain attribute information such as file type, ownership information, access permissions, access times, modification times, and file size. Inodes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When an application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and clear bits to signify blocks available for future allocation.

The terms real-data and metadata classify application program data and file system structure data, respectively. In other words, real-data is data that application programs store in regular files. Conversely, file systems create metadata to store volume layout information, such as inodes, pointer blocks (called indirect blocks), and allocation tables (called bitmaps). Metadata may not be directly visible to applications. Metadata requires a fraction of the amount of storage space that real-data occupies and has significant locality of reference. As a result, metadata caching drastically influences file system performance.

Metadata consistency is vital to file system integrity. Corruption of metadata may result in the complete destruction of the file system volume. Corruption of real-data may have bad consequences to users but will not affect the integrity of the whole file system. A file may have other descriptive and referential information, i.e., other file metadata, associated with it. This information may be relative to the source, content, generation date and place, ownership or copyright notice, central storage location, conditions to use, related documentation, applications associated with the file or services.

Today there are different approaches for implementing the association of a file with metadata of that file. Basically, metadata of a file can be encoded onto the same filename of the file, they can be prepended or appended onto the file as part of a file wrapper structure, they can be embedded at a well-defined convenient point elsewhere within the file, or they can be created as an entirely separate file.

I/O interfaces transport data among the computers and the storage devices. Traditionally, interfaces fall into two categories: channels and networks. Computers generally communicate with storage devices via channel interfaces. Channels predictably transfer data with low-latency and high-bandwidth performance; however, channels typically span short distances and provide low connectivity. Performance requirements often dictate that hardware mechanisms control channel operations. The Small Computer System Interface (SCSI) is a common channel interfaces. Storage devices that are connected directly to computers are known as direct-attached storage (DAS) devices.

Computers communicate with other computers through networks. Networks are interfaces with more flexibility than channels. Software mechanisms control substantial network operations, providing networks with flexibility but large latencies and low bandwidth performance. Local area networks (LAN) connect computers medium distances, such as within buildings, whereas wide area networks (WAN) span long distances, like across campuses or even across the world. LANs normally consist of shared media networks, like Ethernet, while WANs are often point-to-point connections, like Asynchronous Transfer Mode (ATM). Transmission Control Protocol/Internet Protocol (TCP/IP) is a popular network protocol for both LANs and WANs. Because LANs and WANs utilize very similar protocols, for the purpose of this application, the term LAN is used to include both LAN and WAN interfaces.

Recent interface trends combine channel and network technologies into single interfaces capable of supporting multiple protocols. For instance, Fibre Channel (FC) is a serial interface that supports network protocols like TCP/IP as well as channel protocols such as SCSI-3. Other technologies, such as iSCSI, map the SCSI storage protocol onto TCP/IP network protocols, thus utilizing LAN infrastructures for storage transfers.

In at least some cases, SAN refers to network interfaces that support storage protocols. Storage devices connected to SANs are referred to as SAN-attached storage devices. These storage devices are block and object-addressable and may be dedicated devices or general purpose computers serving block and object-level data.

Block and object-addressable devices connect to SANs and share storage among multiple computers. As noted herein, block-address devices are common storage devices that are addressable by fixed length data blocks or sectors; in contrast, object-addressable devices are impending devices that are addressable by an object identifier and an offset into the object. Each object-addressable device may support numerous objects.

SANs are often dedicated networks specifically designed to transport block data; however, SANs may also operate as subsets of general purpose LANs and share the same physical network connections. Therefore, the type of data moving on the network dictates whether a network is a SAN or a LAN.

Local file systems service file-level requests for application programs only running on the same computer that maintains the non-shared file system volume. To achieve the highest levels of performance, local file systems extensively cache metadata and real-data within operating system buffer caches and page caches. Because local file systems do not share data among multiple computer systems, performance is generally very good.

Local file systems traditionally store volumes on DAS devices connected directly to the computer. A weakness of using DAS is that should the computer fail, volumes located on the DAS devices become inaccessible. To reclaim access to these volumes, the DAS devices must be physically detached from the original computer and connected to a backup computer.

SAN technologies enable local file system volumes to be stored on SAN-attached devices. These volumes are accessible to several computers; however, at any point in time, each volume is only assigned to one computer. Storing local file system volumes on SAN-attached devices rather than DAS devices has the benefit that the volumes may be easily reassigned to other computers in the event of failures or maintenance.

Distributed file systems provide users and application programs with transparent access to files from multiple computers networked together. Distributed file systems may lack the high-performance found in local file systems due to resource sharing and lack of data locality. However, the sharing capabilities of distributed file systems may compensate for poor performance.

Architectures for distributed file systems fall into two main categories: NAS-based and SAN-based. NAS-based file sharing places server computers between storage devices and client computers connected via LANs. In contrast, SAN-based file sharing, traditionally known as "shared disk" or "share storage", uses SANs to directly transfer data between storage devices and networked computers.

NAS-based distributed file systems transfer data between server computers and client computers across LAN connections. The server computers store volumes in units of blocks on DAS devices and present this data to client computers in a file-level format. These NAS servers communicate with NAS clients via NAS protocols. Both read and write data-paths traverse from the clients, across the LAN, to the NAS servers. In turn, the servers read from and write to the DAS devices. NAS servers may be dedicated appliances or general-purpose computers.

NFS is a common NAS protocol that uses central servers and DAS devices to store real-data and metadata for the file system volume. These central servers locally maintain metadata and transport only real-data to clients. The central server design is simple yet efficient, since all metadata remains local to the server. Like local file systems, central servers only need to manage metadata consistency between main memory and DAS devices. In fact, central server distributed file systems often use local file systems to manage and store data for the file system. In this regard, the only job of the central server file system is to transport real-data between clients and servers.

Central server designs were early NAS-based distributed file systems. As the need for greater parallelism and enhanced availability grew, distributed file system designs evolved from central servers to multiple server configurations. As with central servers, multiple servers, also known as distributed servers, store all file system data on DAS devices connected to server computers. Since multiple servers cooperatively manage the file system, servers may share metadata between computers. The complexity of these designs increases an order of magnitude, since distributed system integrity requires strong metadata consistency between servers. Such systems often cannot use local file systems to store data. As a result, server software must manage, store, and transport metadata and real-data between servers.

Distributed server file systems have further evolved into designs where clients and servers are often difficult to distinguish. In these systems, clients manage, store, and transport metadata and real-data between servers and other clients.

One aspect of NAS-based file system designs that has remained among central server, distributed server, and merged client-server designs is the direct attachment of storage devices to computers. With devices directly attached to computers, however, a single computer failure renders data stored on the storage devices inaccessible. Although redundant devices on separate computers can be added to improve availability, such techniques add complexity and cost to the system.

Furthermore, the NAS architecture limits performance when clients access data stored on remote devices, because the data-path between client and storage device includes server computers. These servers add overheads caused by server workloads as well as overheads relating to the translations from channel interface protocols to network interface protocols. Server computers designed to support large workloads are very expensive.

At least some distributed file system designs that use SAN technologies have followed a different evolutionary path. Instead of storing data on storage devices connected directly to computers, SAN-based designs store data on SAN-attached devices shared among several client computers. SAN-based designs have high-bandwidth, low-latency data-paths between clients and devices.

SAN-based file systems require arbitration for the storage devices and consistency management of any data cached on the clients. Consistency mechanisms are either centrally located or distributed within the system. The consistency mechanisms may include software running on computers, hardware mechanisms attached to the networks, or a combination of both hardware and software.

There are at least two distinct SAN-based file system designs. The first design uses private file managers, in which client computers independently access metadata and real-data directly from the storage devices. Private file manager schemes do not require dedicated servers, since all necessary data is taken directly from the SAN-attached devices. With private file manager designs, clients only service local file requests.

As a result of their designs, clients utilizing private file managers remain independent from the failures and bottlenecks of other clients. Similarly, client resources such as memory, CPUs, and bus bandwidth are not spent servicing requests from other clients.

The second type of SAN-based distributed file system design utilizes file manager server computers. These file servers manage file system namespace and metadata. SAN clients make requests to the SAN servers, and the servers determine the location of real-data on SAN devices by examining and modifying file metadata. Once the location is determined, the servers either initiate transfers between clients and storage devices or inform the clients how to invoke the transfers. Servers must maintain and store metadata, manage real-data, and control transfers between clients and storage devices. The server design is complex, since servers need to provide a great deal of functionality (e.g., file locking is the feature used to maintain data consistency between hosts). Servers that fail or become overworked tend to disrupt file system operation. The Celerra HighRoad multiplex file system (MPFS) from EMC Corporation is an example of a SAN-based file system that utilizes SAN server file managers to facilitate file transfers between SAN devices and SAN clients. A detailed description of the Celerra system and HighRoad software is given in U.S. Pat. No. 6,324,581 issued Nov. 27, 2001 and U.S. Pat. No. 7,325,097 issued Jan. 29, 2008, both assigned to EMC the assignee of the present invention and hereby incorporated by reference herein.

Local file systems may be used in SAN file sharing environments under various restrictions. For instance, most local file system volumes may be mounted by multiple SAN clients as long as all clients mount the volume in read-only mode. Since the volume does not change, caching performed by the clients does not affect the state of the SAN environment. When files of the volume need to be modified, however, all clients must unmount the volume and then one client re-mounts the volume in read-write mode. This client makes the appropriate modifications and then unmounts the volume. Finally, all clients re-mount the volume in read-only mode. This scheme promotes high-speed file sharing.

Some local file systems are specifically designed to support SAN file sharing environments where one SAN client mounts the volume in read-write mode and all other SAN clients mount the volume read-only. These SAN-based local file systems must frequently flush dirty caches on the read-write client and regularly invalidate stale caches on the read-only clients.

A SAN-based file sharing environment may be configured to serve a large number of NAS client computers using NAS file sharing protocols. SAN clients act as NAS servers that serve volumes stored on the SAN-attached devices to a large number of NAS clients connected to the NAS servers though LANs. Such systems, also known as clusters, combine SAN and NAS technologies into a two tiered scheme. In effect, a NAS cluster can be viewed as a single, large NAS server.

SAN appliances are prior art systems that consist of a variety of components including storage devices, file servers, and network connections. SAN appliances provide block-level, and possibly file-level, access to data stored and managed by the appliance. Despite the ability to serve both block-level and file-level data, SAN appliances may not possess the needed management mechanisms to actually share data between the SAN and NAS connections. The storage devices are usually partitioned so that a portion of the available storage is available to the SAN and a different portion is available for NAS file sharing. Therefore, for the purpose of this application, SAN appliances are treated as the subsystems they represent.

Another adaptation of a SAN appliance is simply a general purpose computer with DAS devices. This computer converts the DAS protocols into SAN protocols in order to serve block-level data to the SAN. The computer may also act as a NAS server and serve file-level data to the LAN.

File system designers can construct complete file systems by layering, or stacking, partial designs on top of existing file systems. The new designs reuse existing services by inheriting functionality of the lower level file system software. For instance, NFS is a central-server architecture that utilizes existing local file systems to store and retrieve data from storage device attached directly to servers. By layering NFS on top of local file systems, NFS software is free from the complexities of namespace, file attribute, and storage management. NFS software consists of simple caching and transport functions. As a result, NFS benefits from performance and recovery improvements made to local file systems.

Other examples of file system layering include adding quota support to existing file system, strengthening consistency of cached data in an existing distributed file system, and adding compression or encryption to file systems without such support.

Most modern operating systems include installable file system interfaces to support multiple file system types within a single computer. In UNIX, the Virtual File System (VFS) interface is an object-oriented, installable interface. While several UNIX implementations incorporate VFS, the interfaces differ slightly between platforms. Several non-UNIX operating systems, such as Microsoft Windows NT, have interfaces similar to VFS.

VFS occupies the level between the system call interface and installed file systems. Each installed file system provides the UNIX kernel with functions associated with VFS and vnode operations. VFS functions operate on whole file systems to perform tasks such as mounting, unmounting, and reading file system statistics. Vnode operations manipulate individual files. Vnode operations include opening, closing, looking up, creating, removing, reading, writing, and renaming files.

Vnode structures are the objects upon which vnode functions operate. The VFS interface creates and passes vnodes to file system vnode functions. A vnode is the VFS virtual equivalent of an inode. Each vnode maintains a pointer called "v_data" to attached file system specific, in-core memory structures such as inodes.

Many file system interfaces support layering. With layering, file systems are capable of making calls to other file systems through the virtual file system interface. For instance, NFS server software may be implemented to access local file systems through VFS. In this manner, the server software does not need to be specifically coded for any particular local file system type; new local file systems may be added to an operating system without reconfiguring NFS.

The nature of non-volatile, vibration-free, small size and low power consumption has made flash memory an excellent component to be utilized in various flash storage devices. Flash storage devices are widely used as memory storage for computer and consumer system products such as notebook, desktop computer, set top box, digital camera, mobile phone, PDA and GPS etc. The increasing demand for more storage in these products has driven the need to expand the capacity of the flash storage devices.

There are two types of flash storage devices. The first type has a pre-defined mechanical dimension. This type includes: (a) Secure Digital (SD) card, (b) Multi Media Card (MMC), (c) Memory Stick (MS) card, (d) Compact Flash (CF) card, (e) Express Flash card, (f) Serial ATA Flash disk, (g) IDE Flash disk, (h) SCSI Flash disk, etc.

The second type of flash storage devices has no pre-defined physical dimension, which includes USB flash disk, Disk On Module (DOM), MP3 player etc. However, based upon the need for the system compactness, it is generally desirable to make this type of flash storage device as small in size and as high in capacity as possible.

Space constraints and available flash memory density are the major obstacles in expanding the capacity of the flash storage devices. A secure digital (SD) card is defined with a form factor. This fixed dimension restricts the number of components populated on a printed circuit board (PCB). For instance, if thin, small out-line package (TSOP) type of flash memory is used, only a flash memory chip and a flash controller can be placed in the space constraint. The available flash memory density further limits the overall SD card capacity.

A flash memory die is the basic element of flash memory. A typical flash memory chip comprises a flash memory die mounted on a substrate within an enclosure and the electrical signals are bonded out to the metal contacts of the package. Popular package types for flash memory chip are TSOP, WSOP (Very Very Thin Small Out-line Package) and BGA (Ball Grid Array) etc.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly.

Furthermore, advances in manufacturing technologies for SSDs may reduce the production costs of SSDs and also increase the storage capacities of SSDs. These developments may provide further incentive to use SSDs in place of magnetic disks in at least some cases.

Solid state disk systems may also comprise communication controllers, such as Fibre Channel (FC) controllers, Ethernet mechanisms, ATA or serial ATA interfaces, or SCSI controllers for managing data communication with external computing devices.

SUMMARY OF THE INVENTION

A method is used in managing metadata. Data of an object is stored in a magnetic hard disk set in an object addressable data storage system. Metadata for the object is stored in an SSD set in the object addressable data storage system. The metadata includes information necessary for determining the location of the data of the object in the magnetic hard disk set.

BRIEF DESCRIPTION OF THE DRAWINGS

Additional features and advantages of the invention will be described below with reference to the drawings, in which.

Figure 1:
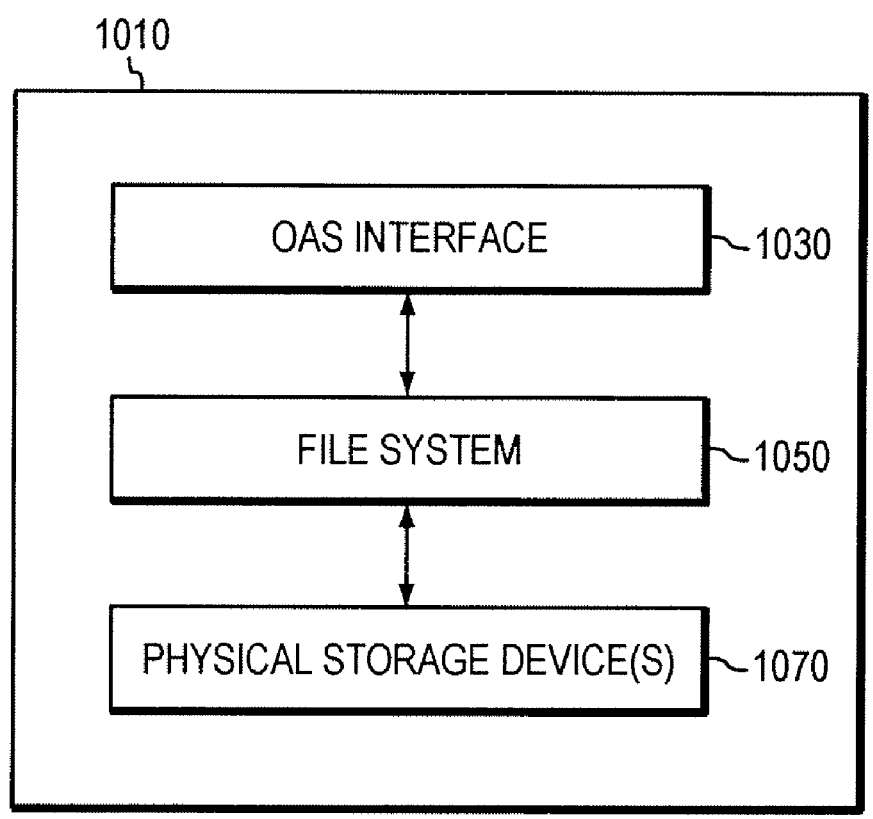
FIGS. 1-7 are block diagrams of data storage systems.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Described below is a metadata management technique which can be used to provide, among other things, a solid state disk based block-device file system with metadata data separation used for LUN virtualization in storage arrays.

A conventional file system which stores both metadata and data on the same address space can thereby make it difficult to position highly valuable parts of a file system such as log journals and metadata on a faster and more expensive storage system. A conventional file system may use a particular organization of metadata to achieve mainly improved performance goals by using caches and intelligently placing different metadata components on disk and by this allowing more sequential disk access. There are also several conventional file systems that separate directory data from file data, for purposes relating to the namespace structure of the file system rather than intimate access to files.

New SSD technology has recently been included in intelligent storage arrays, e.g., in an EMC CLARiiON storage array, in order to virtualize the storage array's LUNs as files in a file system. In accordance with the metadata management technique, efficient use is made of such SSD technology in order to take advantage of the performance characteristics of SSDs, such that a new file system paradigm is used which separates the metadata and the data. This separation allows for a better use of the SSDs (which are more expensive and have lower capacity than typical disk drives), i.e., to store only the relevant metadata information on the higher cost SSD while the data, which is the larger amount of storage, is placed on the lower cost disk drives. This separation helps allow the most valuable resources of the storage array to be used more efficiently.

In particular, an advantage of the metadata management technique is that separating metadata on SSDs from data on hard drives increases the efficiency of the usage of SSDs in storage arrays. In at least one embodiment, the SSDs are used as a mirror pair containing only the metadata of a block device file system, and the mirroring helps ensure the safety of the metadata.

With respect to the context for the metadata management technique, some uses of storage devices, such as virtualizing block storage devices, require a location-independent namespace, dynamic allocation and management of free space, and a scalable and reliable metadata store. A file system provides all of these features, which makes a file an attractive abstraction on which to build virtual block devices or LUNs. However, mapping virtual block devices to files represents an atypical use case for traditional file systems. In a block-device file system objects can be expected to be few in number and very large. These objects will have high data throughput requirements and very high metadata reliability requirements. Thus, this presents challenges to some basic assumptions used in the design of general purpose file-systems.

Each piece of information stored by an organization has its own unique associated business value, performance requirements, and legal requirements. These requirements, taken as a whole, form the service level objective associated with a piece of information. Meanwhile, storage devices offer various levels of reliability, performance and security. A key to effective information management is storing each piece of information on the least costly device which meets the information's service level objective. This can be a challenge, especially when dealing with information stored in file systems.

File data and file metadata are two types of information that for many organizations have different associated service level objectives. Consider an organization that runs an indexing application on its file system every night. The indexing application must read all of the directory information and file access times in the entire file system to determine whether any files have been added, deleted, or moved, and must complete this task within a predictable window of time. For this organization, the performance requirements for file-system metadata (directory listings and file attributes) are very high, while the performance requirements for file data can be much lower since only a limited number of files are actually accessed by users each day. Consider another example: an organization which stores customer medical records in files within its file system. For this organization, the security requirements for file data are extremely high. Indeed, the organization may decide that all file data should be encrypted at rest. File metadata, in this example, has no such security requirement.

The preceding examples demonstrate the variety of service level objectives that can co-exist within a single file system. Unfortunately, traditional file systems are not organized in way that allows users to ensure that these service level objectives are consistently met. All of the most popular modern file systems—including traditional Unix-style file systems such as ext3, sVfs, and ffs, log-structured file systems such as lfs and WAFL, and the dominant Windows-based file system ntfs—comingle data and metadata on the same logical storage devices. In ffs, for example, a logical disk is divided into collections of blocks called cylinder groups, each of which stores both file data blocks as well as file metadata such as free block bitmaps, inodes, and file indirect-blocks. Meanwhile, in lfs data is written to the logical disk in contiguous chunks of blocks called segments, which generally contain bitmaps, inodes, indirect blocks, as well as data blocks. This commingling of data and metadata on a single logical device means that there is no way to achieve different service level objectives for data and metadata in the same file system, without moving file-system specific knowledge into the logical disk layers. The reasons for this inconvenience are based on traditional assumptions about disk behavior and geometry that are often no longer valid in the context of a modern storage fabric, where logical disks are often mapped onto dozens of segments of distinct physical disks in complex striping and redundancy patterns.

Thus traditional assumptions about the on-disk layout of file systems should be revisited in light of the realities of modern storage fabrics and volume management, and a partial or complete physical partition of file data from file metadata should be considered. This approach allows achievement of different service level objectives for data and metadata within a single file system without moving file system layout awareness to the logical disk layers.

Data includes information generated by applications and submitted to file-systems for storage, and metadata includes information generated by file-systems in order to manage and protect application data.

Typical examples of file system metadata are indirect block trees, free-block bitmaps, and file inodes. In at least some cases, user-defined file attributes are considered data.

Traditionally, file system designers have operated under three assumptions about disk behavior:

1. Disks are good at bulk sequential transfers of data.
2. Disks perform poorly when forced to seek.
3. Logically contiguous disk addresses are likely to be physically contiguous.

In light of these three assumptions, it is clear why managing metadata is problematic for file systems. Metadata objects tend to be small, fragmented, and frequently accessed. Metadata operations therefore tend to have a very high seek-to-byte-of-data transferred ratio, resulting in generally poor performance when compared to data operations.

The evolution of file system design can be seen as finding ever more effective ways to avoid seeks while processing large numbers of transactions. The earliest Unix file system, sVfs, located all fixed metadata (bitmaps and inodes) at the front of the disk, with indirect blocks mixed in with the data blocks. The tendency of this layout to lead to long seeks while performing transactions (in order to both read an inode from the front of the disk and a data block from the middle of the disk in a single transaction) was noted and addressed by Berkeley Unix's Fast File System (ffs). ffs located groups of fixed metadata, called cylinder groups, at regular intervals across the entire disk. This layout, along with an intelligent allocation scheme, increased the chances that a file's data blocks and its metadata would be located close to each other on the disk, thus reducing the size and number of seeks when performing transactions. The next logical step was to guarantee locality of a file's data and metadata by making the location of all metadata dynamic. This is precisely the approach of the Log-Structured File System (lfs) which gathers data and metadata updates together and writes them to disk in large contiguous blocks called segments. The lfs approach ensures that, at least on the write path, all disk access is sequential.

Unfortunately, for many applications, the read-path performance is critical, so lfs did not bring an end to the search for ways to reduce disk seeks. Write-back in-memory caching of metadata structures became a common feature of file-system implementations in order to reduce the number of times the file-system was required to read or write blocks to the disk. The technical challenges associated with metadata caching center around ensuring the consistency of the on-disk image of the file system in the presence of faults. Multiple techniques were developed to guarantee on-disk consistency while allowing for aggressive caching of metadata structures, including metadata journaling as well as ordering techniques such as soft updates.

While all of this was going on, a parallel design trend was occurring at the block device level that was slowly calling into question the third assumption above. The last decade and a half has seen ever-increasing layers of abstraction on top of the physical disk topology. Disk drive manufacturers started the trend by introducing on-board memory caches, and failed-sector remapping. Next, integrated cached disk arrays introduced caches that aggregated data from multiple drives, logical volume management which combined multiple physical devices in complex striping and slicing patterns, and RAID algorithms which mixed parity information in with the rest of the data. The resulting logical block device seen by the application has become an ever-more complex aggregation of an ever-larger set of physical devices. Storage networks accelerated this trend by allowing more and more devices to be combined under a single virtual container. With each new mapping layer added to the block device software stack, the old assumption of physical locality implied by adjacent logical disk addresses has been progressively weakened. Storage virtualization solutions which implement dynamic allocation of virtual resources from a pool of physical devices will soon destroy the last remaining shreds of this assumption.

The result of the interactions of these two trends is that while file-system designers have worked hard to achieve more and more logical locality of access in their systems, the leverage for improving performance resulting from these efforts has been steadily shrinking Meanwhile, the commingling of data and metadata in the same logical address space—which is a direct result of the quest for locality of access—has had an unintended negative consequence for users: namely, the inability to achieve differing service level objectives for data and metadata within the same file system. In short, the benefits of the traditional approach to managing data and metadata are shrinking while the costs are increasing. Thus it is proposed herein to separate at least some data and metadata in the file-system layout.

To achieve a service level objective (SLO) for a particular data set, typically an administrator ("admin") must locate a storage device (physical or virtual) which offers the combination of performance, cost and features that meet the requirements of the SLO, and then assign the data-set to reside on the selected storage device. Since a file system typically commingles data and metadata on the same logical storage device, there is no way for an admin to achieve differing SLOs for data and metadata within a single file system. One possible way out of the trap is to insert a volume-level re-director underneath the file system, which can recognize the difference between data and metadata blocks, and map each block to a device with the appropriate service level. A drawback to this approach is that the separation between the file system and volume layers is lost: the re-director implementation depends on knowledge of both layers.

Thus, in accordance with the metadata management technique described herein, the file system layout should provide at least some logical separation between metadata and data. For example, rather than commingling data and metadata on the same logical block devices, the metadata management technique uses disjoint logical block devices for data and metadata. This allows an admin to configure the file system to use storage devices of differing performance, cost, or features, i.e., SSDs and hard disks as described herein, for the storing of data and metadata, thus easily achieving differing SLOs for data and metadata, without collapsing the file-system and volume layers.

Figure 2:
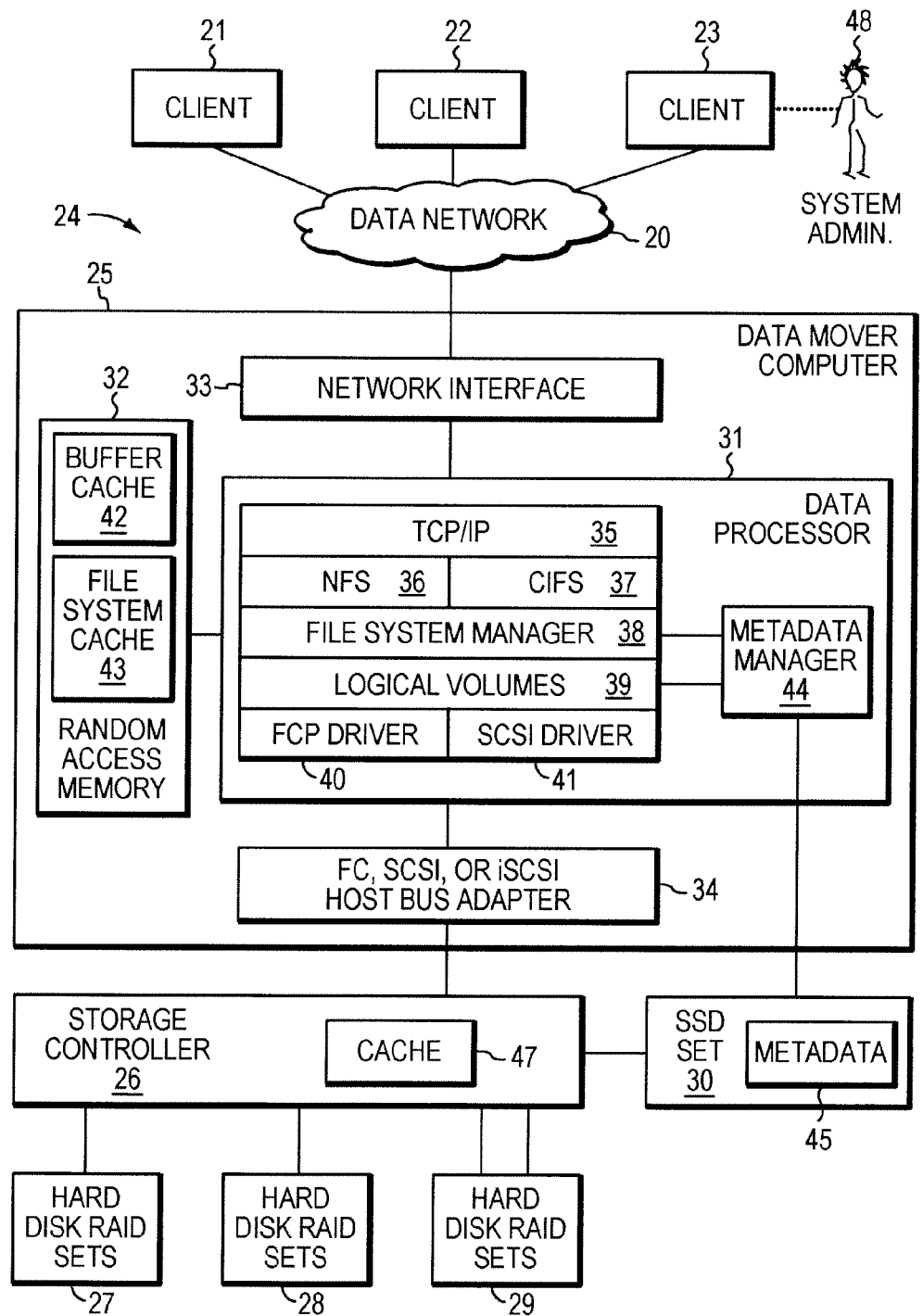

With reference to FIG. 2, there is shown a first example of a data processing system that may be used with the metadata management technique. The data processing system includes a data network 20 interconnecting clients 21, 22, 23 to a network file server 24. The data network 20 may include any one or more of network connection technologies, such as Ethernet, and communication protocols, such as TCP/IP. The clients 21, 22, 23, for example, are workstations such as personal computers using either the UNIX® operating system or the Microsoft WINDOWS® operating system. One of the clients 23 is operated by a system administrator 48.

The network file server 24 includes a data mover computer 25, a storage controller 26, redundant arrays of inexpensive disks (RAID) 27, 28, 29, and SSD set 30. The network file server 24 is managed as a dedicated network appliance, integrated with popular network file systems in a way, which, other than its superior performance, is transparent to the end user. The data mover computer 25, for example, is a high-end commodity computer. Further details regarding the construction of a network file server using a data mover computer and a storage controller are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

The data mover computer 25 includes a data processor 31, random access memory 32, a network interface 33 providing a port to the data network 20, and a host bus adapter 34 for providing a Fibre Channel (FC), Small Computer Systems Interface (SCSI), or SCSI over IP (iSCSI) link to the storage controller 26.

The data processor 31 is programmed primarily for servicing network client requests for access to files stored in the RAID sets of disk drives 27, 28, 29. This programming includes a TCP/IP programming layer 35 for communicating with the network clients 21, 22, 23 in accordance with the Transmission Control Protocol (TCP), a Network File System (NFS) module 36 for network file access in accordance with the NFS file access protocol, a Common Internet File System (CIFS) module 37 for network file access in accordance with the CIFS file access protocol, a file system manager 38, a logical volumes layer 39, a Fibre Channel Protocol (FCP) driver 40, and an SCSI driver 41.

The random access memory 32 includes a buffer cache 42 and a file system cache 43. Read data and write data are streamed through the buffer cache 42 between the network clients 21, 22, 23 and the storage controller 26. The file system manager 38 maintains recently accessed file system data and metadata in the file system cache 43. For example, each file system is a UNIX®-based file system managed as described in Uresh Vahalia, *Unix Internals: The New Frontiers*, Chapter 9, "File System Implementations," Prentice-Hall, Inc., New Jersey, 1996, p. 261-289.

Each file system includes a hierarchy of directories and files. Each file system is built on a logical volume of contiguous logical block addresses of storage accessible through the storage controller 26. The storage controller 26 is configured to map the logical block addresses of each logical volume to one or more of the RAID sets 27, 28, 29. The storage controller 26 may also have a random access cache memory 47 for storing recently accessed data in the RAID sets.

The SSD set 30 may be, include, or be included in, for example, one SSD or a set of two SSDs arranged as a RAID-1 system. As described above and further below, SSD set 30 stores metadata 45 for use by file system manager 38 and managed by metadata manager 44.

The file system or the logical volume upon which the file system is built is constructed so that management of metadata 45 can be transparent to the clients 21, 22, 23. For example, to access file data, file system manager 38 accesses metadata 45 in SSD set 30 which aids file system manager 38 in locating the file data in one or more of RAID sets 27, 28, 29.

Figure 3:
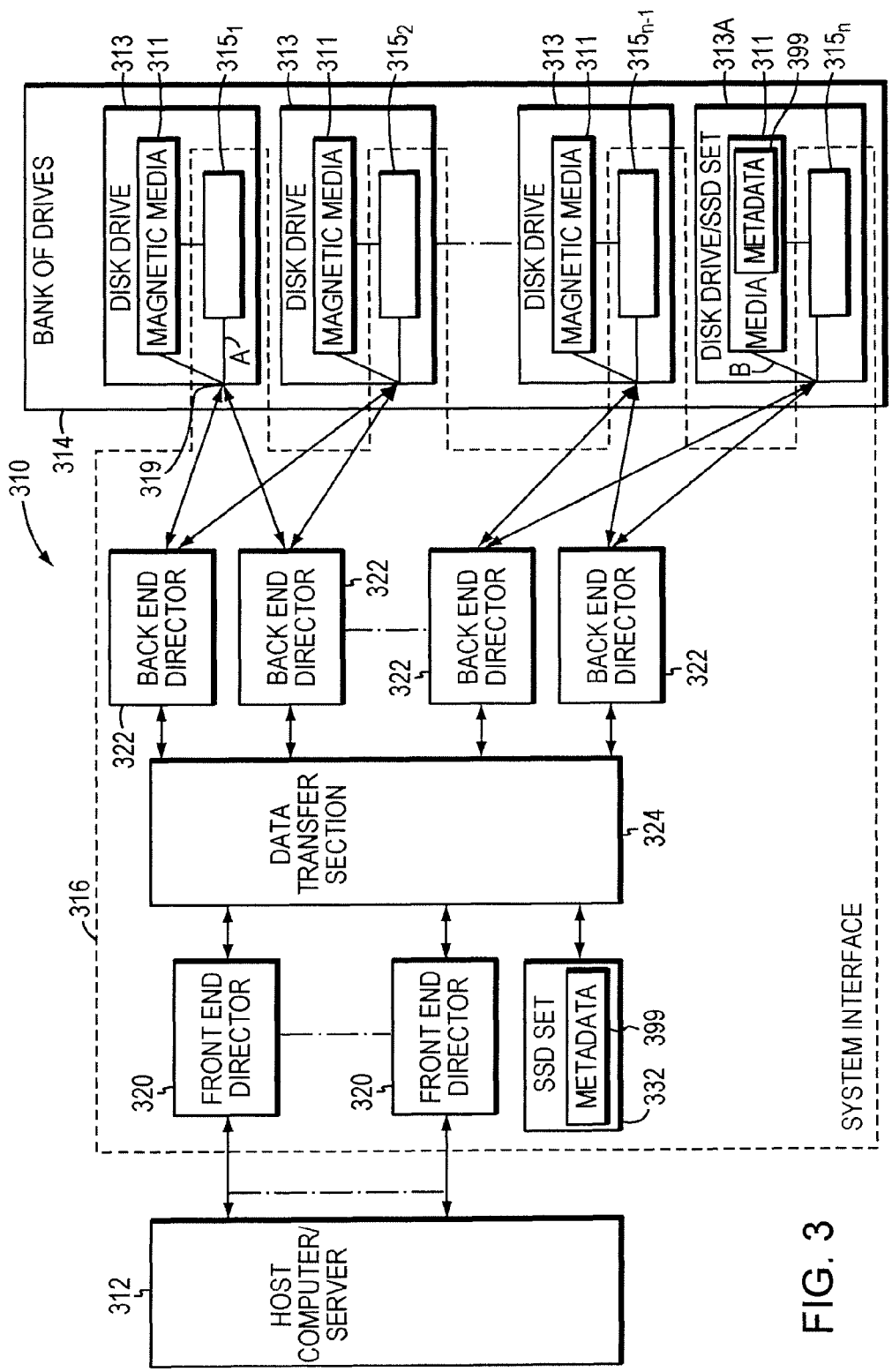

FIG. 3 illustrates a second example of a data storage system 310 which may be used with the metadata management technique. Data storage system 310 has a host computer/server 312 coupled to a bank of disk drives 314 through a system interface 316. The interface 316 comprises: a plurality of front-end directors 320 coupled to the host computer/server 312; a plurality of back end directors 322 coupled to the bank of disk drives 314; drive controllers $315_1$-$315_n$, and a global cache memory. The interface may also comprise memory or drive 332 as described in more detail below. The interface 316 also includes a data transfer section 324 coupled to the plurality of front and back end directors 320, 322. The front-end directors 320 and the back end directors 322 control, the transfer of user data between the host computer/server and bank of disk drives as such user data passes through the data transfer section. The interface may be used, for example, to present one or more LUNs to the system or to the host computer wherein each LUN operates in a RAID mode using storage space from one or more of the disk drives 314.

In one example embodiment of data flows in accordance with the metadata management technique, an external request (I/O) is sent from host computer/server 312 to system 310. To service the request, system 310 accesses metadata 399 in an SSD set 332 and/or 313A. The SSD set 332 may be, include, or be included in, for example, one SSD or a set of two SSDs arranged as a RAID-1 system. Using metadata 339, system 310 locates data blocks on drives 314 for servicing the request.

The following is an example of the commands forming a file access in accordance with the metadata management technique and the embodiment shown in FIG. 2. Other embodiments are possible and contemplated. Similar commands may be used between other clients and/or storages. It is noted that the commands are routed among client 21, file system manager 38, file system cache 43, storage controller 26, and metadata manager 44 shown in FIG. 2.

Client 21 initiates a file access by sending an open file command to file system manager 38. The open file command may include an encoding identifying the command as an open file command, and further includes the file name of the file to be opened. Additionally, the open file command may include a user identification (e.g. user name or a number) identifying the user which is requesting that the file be opened. It is noted that, as used herein, opening a file refers to converting the file name to a value which can be used to access the file. During the opening of the file, permission information may be checked to ensure that the file is accessible and/or writeable by the user, etc., as desired.

File system manager 38 checks the file system cache 43, and, if necessary, prompts metadata manager 44 to retrieve data via storage controller 26 from metadata 45 in SSD set 30. File system manager 38 responds to the open file command with a positive response. File system manager 38 may also respond with a negative response if an error condition is detected (e.g., the file does not exist in directories in metadata 45, or the user does not have permission to open the file, etc.). The positive response includes a file ID from metadata 45 identifying the file on the storage storing the file. As used herein, the file identifier (file ID) may be any value identifying the file to the storage storing the file. The file ID may be a number, for example, rather than the string of characters comprising the file name. In one embodiment, the file ID may be an "I-number" identifying an inode in metadata 45 which locates the file with the storage. More particularly, the I-number may be an index into an inode file within a block map in metadata 45. The corresponding inode may be stored at that index.

The positive response may further include a device ID. The device ID may be an address for the storage storing the file (e.g., RAID set 27, in this example).

Additionally, the positive response may include an access key. The access key may be provided for security purposes. The key may include permission information, and may further serve to identify client 21 as the one who opened the file. File system manager 38 may transmit a message to storage controller 26 indicating that the file was opened. The message may include the file ID, and may further include the user name and the same access key sent to client 21. The positive response may further include a checksum for the file (not shown), if desired.

Client 21 may perform one or more read or write commands (access commands) to the file. The access command includes an encoding of the read or write nature of the command, and the file ID. Additionally, the access command may include an offset into the file to locate the data desired by the operation. Other embodiments may locate the data via other mechanisms. The access command may include a size identifying the number of bytes to be read or written. If the access command is a write, the data to be written is also included. As noted above, the size of the access command may be a number of bytes less than or greater than the number of bytes in a block. Furthermore, the command may not be aligned to block boundaries. Instead, the size of the command may be the actual number of bytes actually desired by client 21. The access command may also include the access key, if desired.

File system manager 38 responds to the access command with a positive response. If the access command is a read, the positive response includes the read data retrieved from RAID set 27. The positive response may further include a checksum for the data, if desired. File system manager 38 may respond with a negative response if an error is detected.

In at least some embodiments, access commands are transmitted from client 21 to file system manager 38 independent of any operation of metadata manager 44. In other words, once the file ID is provided by metadata manager 44, the remainder of the operation does not involve metadata manager 44 (until the file is closed).

Once client 21 has completed the access commands to the file, client 21 may transmit a close file command. The close file command may include the file ID, and may further include the access key. File system manager 38 may respond with a positive response, which again may include a checksum, if desired. If an error is detected during the file close, File system manager 38 may respond with a negative response instead.

Additionally, in response to the file close command, file system manager 38 may transmit a message to metadata manager 44 which accesses metadata 45. The message may indicate the file ID of the file that has been closed, and may further include a new checksum for the file, if the file has been modified.

In at least one embodiment, file system manager 38 may treat the commands of a file access as a transaction. More particularly, the modifications to the file in response to one or more write commands may all be performed successfully, or none of them may be performed and the file may remain in the same state that it was prior to the transaction. The transaction is committed via a commit command. In the illustration, the file close command may be the commit command for file system manager 38. (In at least some systems, at file close all the cached blocks must be committed; however, the other way around may not necessarily be true). Additionally, a synchronization command (e.g. the Unix fsync command) may be supported which may commit all prior changes without closing the file. By treating the updates as a transaction, file integrity may be enhanced in the presence of a system failure. Since the updates are atomically performed via the commit command (rather than possibly partially performed over time as the various write commands are performed), the commit will have been processed either before the system failure (and thus the file updates are recorded by file system manager 38 after the failure) or after the system failure (and thus the file updates are not recorded by file system manager 38).

One or more embodiments may have one or more of the following characteristics. Use of the SSD sets may nearly eliminate overhead for managing metadata. The metadata management technique may be used with any environment having mapped objects (e.g., files or mapped objects or virtualization objects). At least some operations that do not involve accessing object data (e.g., directory listings) may be executed by use of the metadata in the SSD set without requiring any access to data on hard disks. Metadata from the SSD set may be cached (e.g., in a file system cache such as cache 43) or may be served directly out of the SSD set. In the latter case, all or some of the cache may be eliminated or devoted to caching data (content) instead of metadata. The SSD set may be connected to the storage system in the same way as a conventional hard disk (e.g., as a Fibre Channel drive) or may be connected as memory or in another way (e.g., as a SD card or other flash memory). All or part of the SSD set may be included in a hybrid disk drive device that includes an SSD or other persistent semiconductor memory in addition to a conventional hard disk. The metadata stored in the SSD set may include at least mapping table information. For accesses in which conventional disk access for metadata takes approximately as long as conventional disk access for the data involved, the metadata management technique may approximately double access performance. The metadata management technique may have particular applicability to applications having fine grained mapping tables such as file system storage, storage virtualization, point in time snapshots, or data de-duplication. At least one embodiment may use the SSD set in combination with inexpensive slow disk drives to achieve performance comparable to conventional disk-only solutions. In at least one embodiment, the address space in the system may be arranged such that holding metadata in the SSD requires minimal or little changes to the system depending on the extent to which storage locations are found by lookup or by calculated values; for example, it may be determined which blocks in the system pertain to metadata and accesses to corresponding addresses may be satisfied out of the SSD set. The metadata held in the SDD may include fixed metadata (e.g., bitmaps) and dynamic metadata (e.g., mapping information, directory trees, directory listings, folder attributes). Performance of the system after powerup may be improved over conventional systems because the SSD set includes persistent (nonvolatile) memory and therefore after powerup does not need to be reloaded with metadata unlike conventional volatile memory cache. Thus at least part of a new strategy behind choosing what to put in the cache may instead depend on whether losing the cached data would impact consistency of the file system, rather than improving the performance of metadata operations.

The metadata management technique is particularly useful in storage virtualization situations such as thin provisioning and snapshots. In storage virtualization situations, storing and retrieving small amounts of data, particularly from a shared data source, incurs a relatively large amount of overhead. This is at least in part due to the fact that virtualization involves the overhead of maintaining and processing a lot of metadata in the form of mapping information such as mapping tables that map between logical or virtual objects and physical objects. Thus, conventionally, the time spent performing disk accesses for overhead operations in these situations, for small amounts of data, can often match or exceed the time spent actually storing and retrieving the desired data.

Consider, for example, that if a block is virtualized as a file, reading the virtual block involves processing mapping data to find the file and then involves at least some of the steps required for a typical file system to read data, such as: 1) receiving a request from a program that directs the operating system or file system to open a file in accordance with a file name, path, and attributes specified by the request; 2) locating a file table of contents and determining whether the read operation can be executed; 3) updating status data to reflect access to the file, including a counter reflecting the number of programs that have the file open and the time at which the file was most recently accessed, and the like; 4) returning a handle to the program by which the program can quickly refer to the file; 5) preparing, by the program, to operate on the file by updating internal tables that show the state of open files, allocating buffers, and the like; 6) issuing system calls to perform file I/O, including set-position, read, and write calls, and processing those system calls; 7) creating and operating exclusive access devices, if necessary, including mutexes, readers/writer locks, file locks, record locks, and the like; and 8) when the program is done with the file, closing the file, resulting in buffers being flushed, file tables updated, memory deallocated, and the like, both by the program and by the operating system and/or file system.

If many or all of these steps involve disk accesses because the mapping data, the file table of contents, status data, and other metadata described above is stored on disk, accessing the virtual block can involve many more disk accesses than accessing a non-virtual block, for example, with corresponding adverse affects on performance.

Conventionally, one strategy has included using cache memory to store at least some of the metadata so that processing it involves memory accesses rather than disk accesses. However, cache memory is expensive and therefore relatively small, especially compared to the size of metadata in virtualization situations, which grows as the amount of data stored increases. Therefore, metadata is paged in and out of cache memory, which involves disk accesses and thereby nullifies much of the advantage of using the cache memory for metadata.

By contrast, while SSD is more expensive than hard disk memory, it is less expensive than cache memory. Therefore it is practical to use an SSD set having a capacity much larger than the cache memory, and potentially large enough to store all or a large portion of the metadata that is processed in virtualization situations, so that under the metadata management technique little or no such processing involves disk accesses.

In accordance with the metadata management technique, with respect to metadata being held in the SSD set for use with a block-device file system for block device virtualization, an example of such an approach is now described.

In the example, the metadata management technique may be used in connection with technology as described in co-pending U.S. patent application Ser. No. 11/772,159, entitled COMMON BLOCK VIRTUALIZATION PLATFORM, filed Jun. 30, 2007, to Bono et al ("074 application"), which is hereby incorporated herein by reference, and which is co-pending with the instant patent application and is assigned to the same assignee as the instant patent application. The 074 application describes a common block virtualization platform that includes a stack of software program layers for a meta-data server or a file server. The software program layers provide in-band and out-of-band virtualization services common to production file systems and logical unit numbers (LUNs) of data storage. The software program layers include an application program interface (API) program layer, a container file systems program layer, and a sparse metavolumes program layer. The sparse metavolumes layer has programs for creating a sparse metavolume and maintaining a slice map indicating slices of logical storage that are provisioned with configured slices of data storage. The container file systems layer has programs for creating and maintaining a container file system on the sparse metavolume. The API program layer provides a client and application program interface to the container file systems layer and the sparse metavolumes layer. In at least one embodiment, the platform is based on a network file server further described in Vahalia et al., U.S. Pat. No. 5,893,140, incorporated herein by reference, and Xu et al., U.S. Pat. No. 6,324,581, issued Nov. 27, 2001, which are also incorporated herein by reference.

Figure 4:
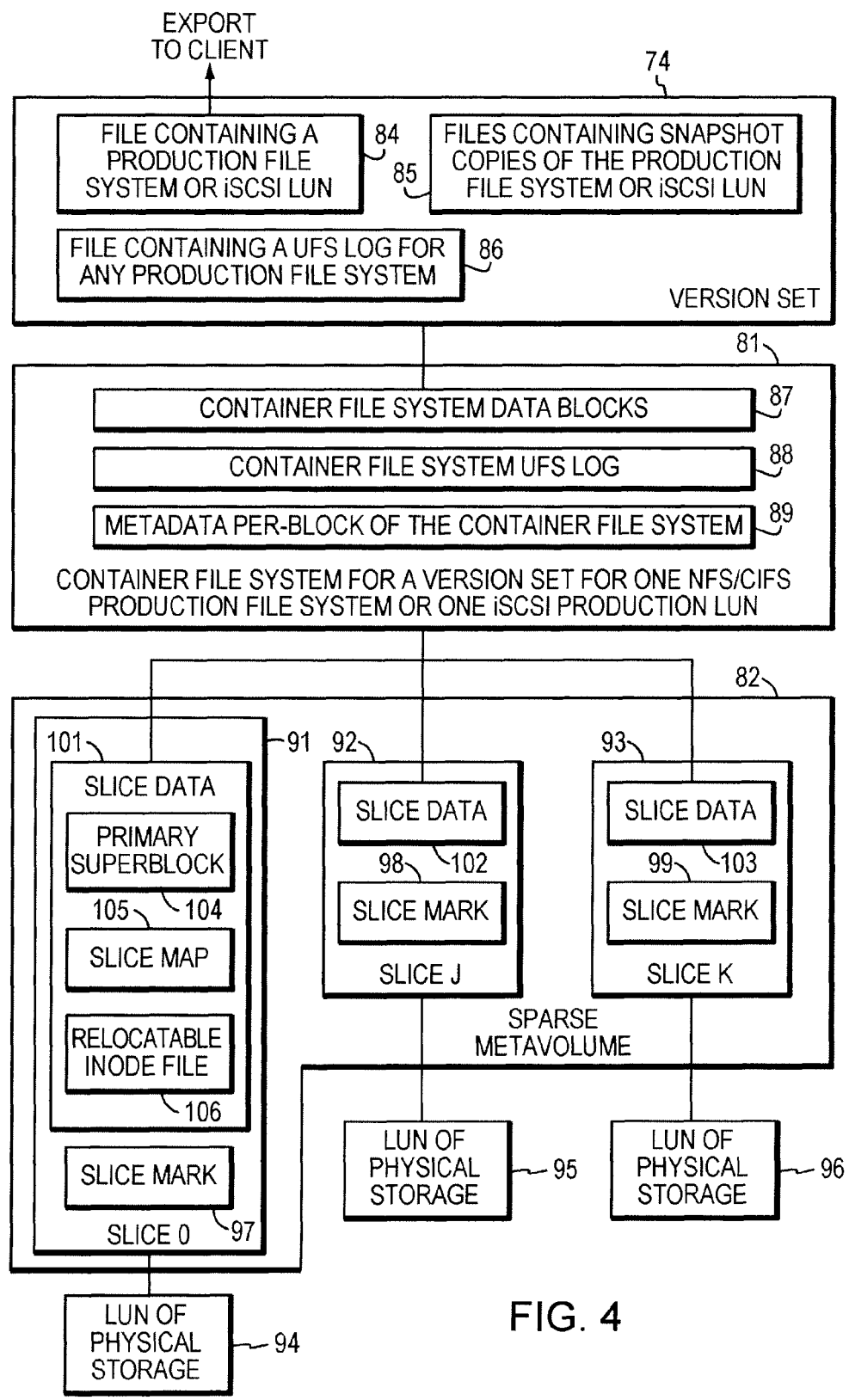

As further described below with reference to FIG. 4, the platform of the 074 application provides enhanced decoupling of logical storage from physical storage by storing version sets of an iSCSI LUN or a user file system in a container file system built upon a sparse metavolume. A container file systems layer provides access to the container file systems, and a sparse metavolumes layer provides access to the sparse metavolumes. A common block virtualization library provides an application interface to the container file systems layer and the sparse metavolumes layer by translating from asynchronous to synchronous operation and implementing exchange semantics.

The sparse metavolumes layer provides a free mapping from certain slices of the logical extents of the metavolumes to configured slices of logical storage in a cached disk array. The configured slices of logical storage are defined by storage configuration information in a volume database in the cached disk array. The sparse metavolumes layer is layered over a SCSI driver and a Fibre-channel protocol (FCP) driver in order to access the configured slices of logical storage in the cached disk array. The data mover sends storage access requests through a host bus adapter using the SCSI protocol, the iSCSI protocol, or the Fibre-Channel protocol, depending on the physical link with the cached disk array.

The metadata management technique provides improved performance for thin provisioning of a production file system or an iSCSI LUN exported to a client. As shown in FIG. 4, the platform of the 074 application provides a file server architecture including a container file system 81 built on a sparse metavolume 82 for enhanced decoupling of logical storage from physical storage and for providing common supplementary storage services for iSCSI block access and for NFS or CIFS file system access.

The container file system 81 provides a container for a version set 74 for one production file system or iSCSI LUN 84. The version set 74 may also include any number of snapshot copies 85 of the production file system or iSCSI LUN 84. If the production object 84 is a production file system, then the version set 74 may also include a UFS log 86 for the production file system. By including the UFS log in the version set, an instantaneous snapshot or backup copy of the UFS log together with the production file system 84 can be made without pausing the production file system for flushing the UFS log prior to making the snapshot or backup copy. Instead, the UFS log can be flushed into the snapshot or backup copy anytime after the snapshot copy is made, prior to or during any restore of the production file system with the snapshot or backup copy.

The container file system 81 manages storage space among the production file system or iSCSI LUN and its snapshot copies 85. It is possible for the container file system to provide storage into the hundreds of terabytes, for supporting thousands or more snapshots of a single production file system or iSCSI LUN.

The container file system 81 also provides improved fault containment because it is hosting a single production file system or iSCSI LUN and its snapshots. In addition to the container file system data blocks 87, the container file system 81 includes a container file system UFS log 88 and metadata 89 per-block of the container file system for enhanced detection, isolation, recovery, and reporting of any erroneous or unstable file system metadata.

For thin provisioning of the container file system 81, the sparse metavolume 82 has the ability to aggregate a plurality of N slices of the same size of logical storage space together into a contiguous logical extent while some of these slices may or may not be provisioned. A slice-0 at an offset zero in the logical extent is always provisioned. Each provisioned slice has a corresponding configured storage slice object 91, 92, 93 that is mapped to a corresponding LUN of physical storage 94, 95, 96. Each configured storage slice object 91, 92, 93 has a respective slice mark 97, 98, 99 containing metadata and state information for the provisioned slice, and a respective area of storage 101, 102, 103 for containing slice data. The slice data comprise the sectors of storage backing the container file system.

An initial slice 91, referred to as slice-0, is always provisioned with backing store, so that some of the slice data 101 is available to store metadata and management information for the sparse metavolume 82 and the container file system 81. This metadata and management information includes a primary superblock 104, a slice map 105, and a relocatable inode file 106. The primary superblock 104 includes metavolume metadata such as the size of the sparse multivolume and the constant size of each slice in the sparse metavolume 82. The slice map 105 indicates whether or not any given slice of the sparse metavolume is provisioned, and if so, the slice identifier of the configured slice object. The slice identifier identifies a slice of logical storage configured from the same kind of storage in the cached disk array.

The kind of storage backing each slice is indicated by a particular value of a parameter called the automatic volume management (AVM) type of the storage. Storage having a similar group of performance characteristics (such as access time, bandwidth, and read-write capability) is indicated by the same value for the AVM type. The slice map 105 includes the AVM type of each slice provisioned in the metavolume. The slice map also provides a way of quickly searching for a free block of storage in a provisioned slice of a given AVM type in the metavolume.

Thus, the slice map is used for allocating backing storage to the metavolume for provisioning data blocks to the container file system, and for reading data from or writing data to the metavolume or the container file system. In addition, the slice map is used for deallocating blocks from a slice in a shrink process, for selecting a slice for deallocation in the shrink process, for fault detection, and for fault containment.

The shrink process may remove a provisioned slice from anywhere in the sparse metavolume except slice-0 which may only be relocated to storage of a different type but which should be present at all times during the relocation process. In a shrink process, statistics maintained in the slice map are used to determine which provisioned slice should be selected to have its blocks deallocated, without having to search all of the cylinder groups of the container file system. When a provisioned slice is selected for deallocation in accordance with a configured shrink policy, the storage reorganizer is invoked to migrate the data of allocated file system blocks to free file system blocks of other provisioned slices in the container file system, and to remap the migrated file system blocks in the cylinder group. After all the data of all of the container file system blocks have been vacated from the slice, then the storage slice object is removed from the sparse metafile system and returned to a pool of free slices.

The fault containment logic uses the slice map for marking slices or cylinder groups which are unstable to prevent any subsequent access until the object becomes stable again. The slice map is also used to ensure that the container view of the sparse metavolume matches the state of the sparse metavolume itself (as indicated in the slice marks of the provisioned slices). If an inconsistency is found, then it is caught before further damage is done.

The relocatable inode file 106 is provided for use in connection with the remapping of in-use inodes of the container file system which belong to a slice that needs to be evacuated. While remapping these inodes, the inode number initially assigned to each of these inodes will not change or else it will defeat the container file system's directory logic as well as applications such as NFS which use the inode number within the file handle. So, as soon as at least one inode is remapped, the relocatable inode file is created, and from then on, any inode lookup first checks the relocatable inode file to find out whether an inode is at its original location or whether the inode has been remapped. The inode number that this inode is known by U×FS is used as an index in the file, and if there is no corresponding entry for this number in the file, it means that this inode has not been remapped and may be found at its original location. Conversely, if there is an entry for this inode number in the file, then it will contain the storage location that this inode number has been remapped to.

With respect to the metadata management technique, by using an SSD set as described above to store some or all of various types of metadata described above, performance of the system may be improved. At least one or more of the following may be stored in the SSD set: log 88, metadata 89, objects 91, 92, 93, slice marks 97, 98, 99, superblock 104, slice map 105, and inode file 106. For example, conventionally, the slice mark may occupy the first two sectors (of 256 K bytes per sector) of the provisioned LUN of physical storage, and the slice data may occupy the remaining sectors of the provisioned LUN of physical storage. However, in accordance with the metadata management technique, the slice mark may be stored in the SSD set instead of the provisioned LUN of physical storage, so that latencies associated with accessing the slice mark are much reduced.

In another example, in accordance with the metadata management technique, metadata used with a thin provisioning system is held in the SSD set.

Figure 5:
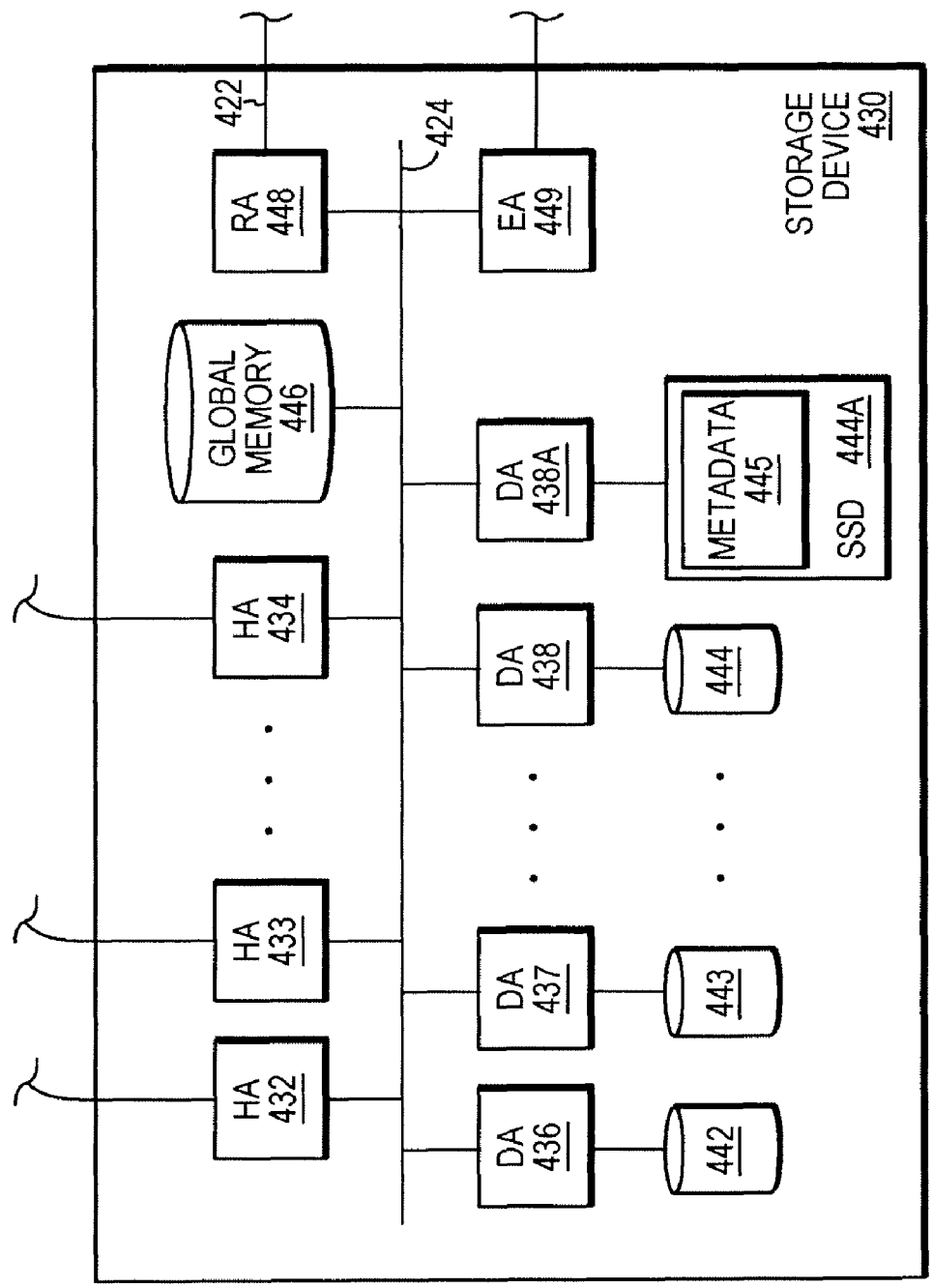

FIG. 5 is a schematic illustration showing a storage device 430 that includes a plurality of host adapters (HA) 432-434, a plurality of disk adapters (DA) 436-438A, a plurality of disk drives 442-444, and an SSD set 444A having metadata 445 as described below. The disk drives 442-444 should be understood as representing any appropriate type of storage media, including, without limitation, conventional disk drives, DRAM cache, flash or other solid-state storage device, tape, optical media, and/or any combination of permanent, semi-permanent and temporally-limited storage media. Each of the disk drives 442-444 is coupled to a corresponding one of the DA's 436-438. Although FIG. 5 shows a one-for-one correspondence between the DA's 436-438 and the disk drives 436-438, it should be understood that it is possible to couple more than one disk drive to a DA and/or to couple more than one DA to a disk drive. The storage device 430 also includes a global memory 446 that may be accessed by the HA's 432-434 and the DA's 436-438. The storage device 430 also includes an RDF (Remote Data Facility) adapter (RA) 448 that may also access the global memory 446. The RA 448 may communicate with one or more additional remote storage devices and/or one or more other remote devices via a data link 422. The storage device also includes an external storage adaptor (EA) 449 that may be used to communicate with one or more other storage devices that could either be the same type of storage device as the storage device 430 or could be a different type of storage device. The HA's 432-434, the DA's 436-438, the global memory 446, the RA 448 and the EA 449 may be coupled to a bus 424 that is provided to facilitate communication therebetween. In various embodiments, additional RA's and/or EA's may be incorporated into the storage device 430.

Each of the HA's 432-434 of the storage device 430 may be coupled to one or more host computers that access the storage device 430. The host computers (hosts) access data on the disk drives 442-444 through the HA's 432-434 and the DA's 436-438. The global memory 446 contains a cache memory that holds tracks of data read from and/or to be written to the disk drives 442-444. SSD set 444A has storage for metadata 445 including tables that may be accessed by the HA's 432-434, the DA's 436-438, the RA 448, and the EA 449. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries (which pointers may be included in metadata 445).

Figure 6:
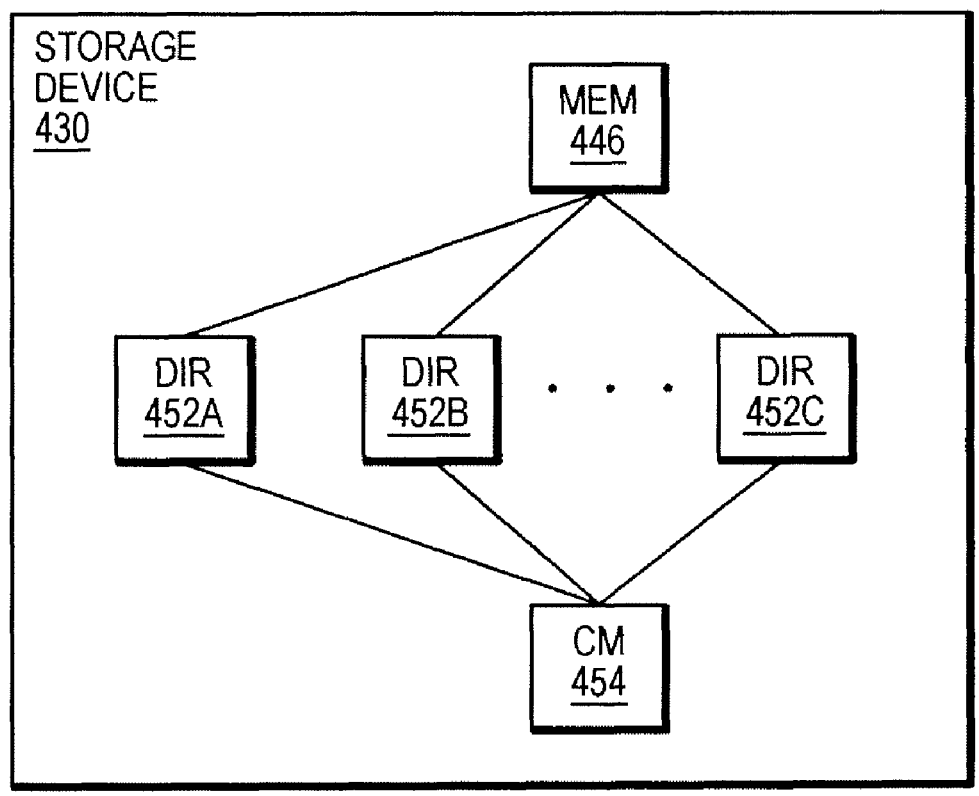

FIG. 6 is schematic diagram showing an embodiment of the storage device 430 where each of a plurality of directors 452a-452c are coupled to the memory 446. Each of the directors 452a-452c may represent one or more of the HA's 432-434, the DA's 436-438, the RA 448 and/or the EA 449. In an embodiment disclosed herein, there may be up to sixty-four directors coupled to the memory 446. Of course, for other embodiments, there may be a higher or lower maximum number of directors that may be used.

FIG. 6 also shows an optional communication module (CM) 454 that provides an alternative communication path between the directors 452a-452c. Each of the directors 452a-452c may be coupled to the CM 454 so that any one of the directors 452a-452c may send a message and/or data to any other one of the directors 452a-452c without needing to go through the memory 446. The CM 454 may be implemented using conventional MUX/router technology where a sending one of the directors 452a-452c provides an appropriate address to cause a message and/or data to be received by an intended receiving one of the directors 452a-452c. Some or all of the functionality of the CM 454 may be implemented using one or more of the directors 452a-452c so that, for example, the directors 452a-452c may be interconnected directly with the interconnection functionality being provided on each of the directors 452a-452c. In addition, a sending one of the directors 452a-452c may be able to broadcast a message to all of the other directors 452a-452c at the same time.

In some embodiments, one or more of the directors 452a-452c may have multiple processor systems thereon and thus may be able to perform functions for multiple directors. In some embodiments, at least one of the directors 452a-452c having multiple processor systems thereon may simultaneously perform the functions of at least two different types of directors (e.g., an HA and a DA). Furthermore, in some embodiments, at least one of the directors 452a-452c having multiple processor systems thereon may simultaneously perform the functions of different types of director and perform other processing with the other processing system. Generally, the system described herein could work with any appropriate hardware configuration, including configurations where at least some of the memory 446 is distributed among at least some of the directors 452a-452c and in configurations where a number of core processors are coupled to a generic interface card.

The system described herein is suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 7:
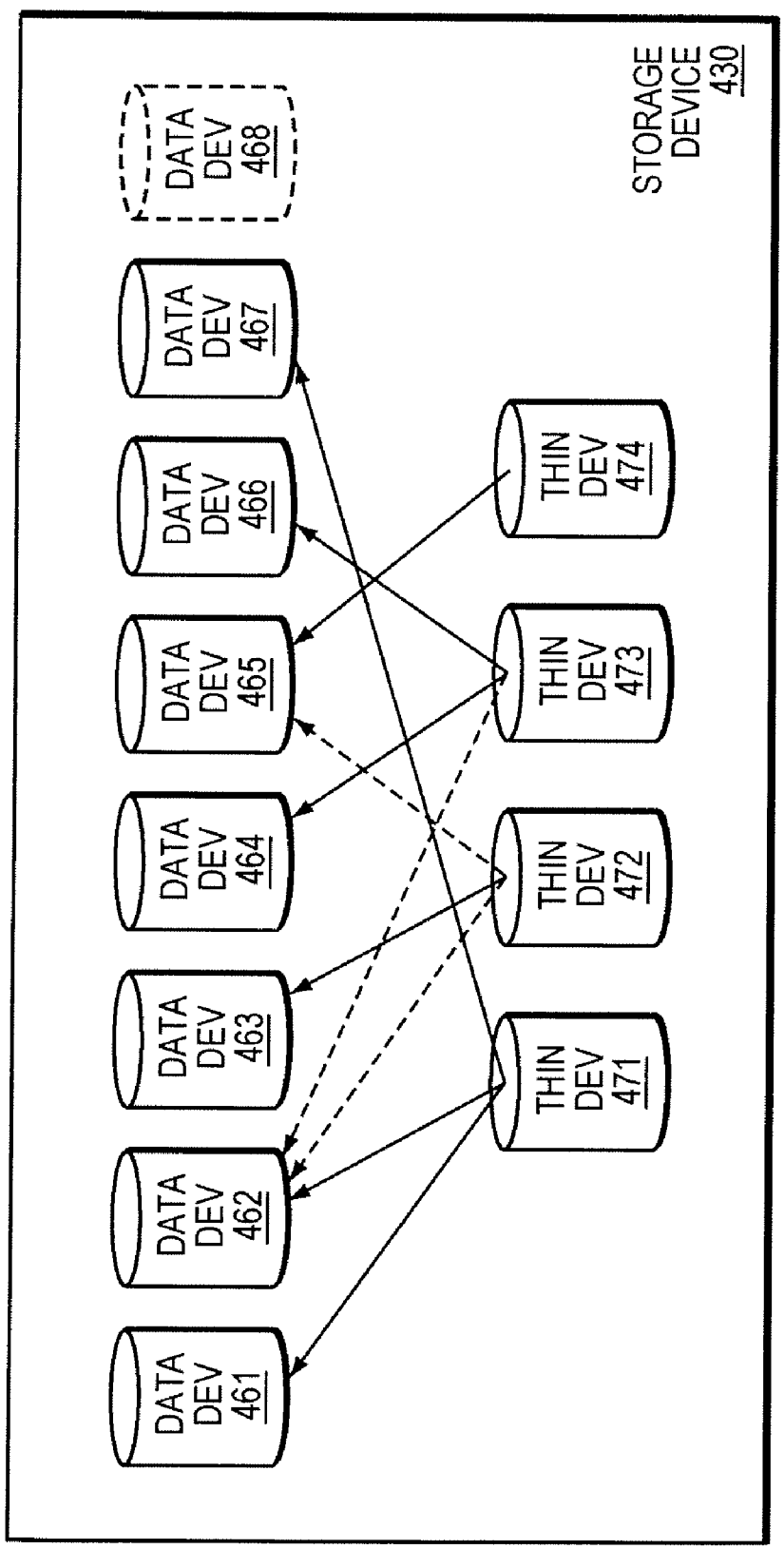

FIG. 7 is a schematic diagram showing the storage device 430 as including a plurality of data devices 461-468. Data devices 461-467 may be implemented as logical devices like standard logical devices provided in a Symmetrix data storage device. In some embodiments, the data devices 461-467 may not be directly useable (visible) to hosts coupled to the storage device 430. Each of the data devices 461-467 may correspond to a portion (including a whole portion) of one or more of the disk drives 442-444. Thus, for example, the data device 461 may correspond to the disk drive 442, may correspond to a portion of the disk drive 442, or may correspond to a portion of the disk drive 442 and a portion of the disk drive 443. The data devices 461-467 may be designated as corresponding to different classes, so that different ones of the data devices 461-467 correspond to different physical storage having different relative access speeds or RAID protection type (or some other relevant distinguishing characteristic or combination of characteristics). The data device 468 is illustrated with broken lines to indicate that the data device 468 does not yet exist but may be created.

The storage device 30 may also include one or more thin devices 471-474. Each of the thin devices 471-474 may appear to a host coupled to the storage device 430 as a logical volume (logical device) containing a contiguous block of data storage. Each of the thin devices 471-474 may contain or reference tables (e.g., in metadata 445) that point to some or all of the data devices 461-467 (or portions thereof), as further discussed elsewhere herein. In some instances, the thin devices 471-474 may be concatenated to form a metavolume of thin devices. In some embodiments, only one thin device may be associated with the same data device while, in other embodiments, multiple thin devices may be associated with the same data device, as illustrated in the figure with arrows having broken lines.

In some embodiments, it may be possible to implement the system described herein using storage areas, instead of storage devices. Thus, for example, the thin devices 471-474 may be thin storage areas, the data devices 461-467 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Figure 8:
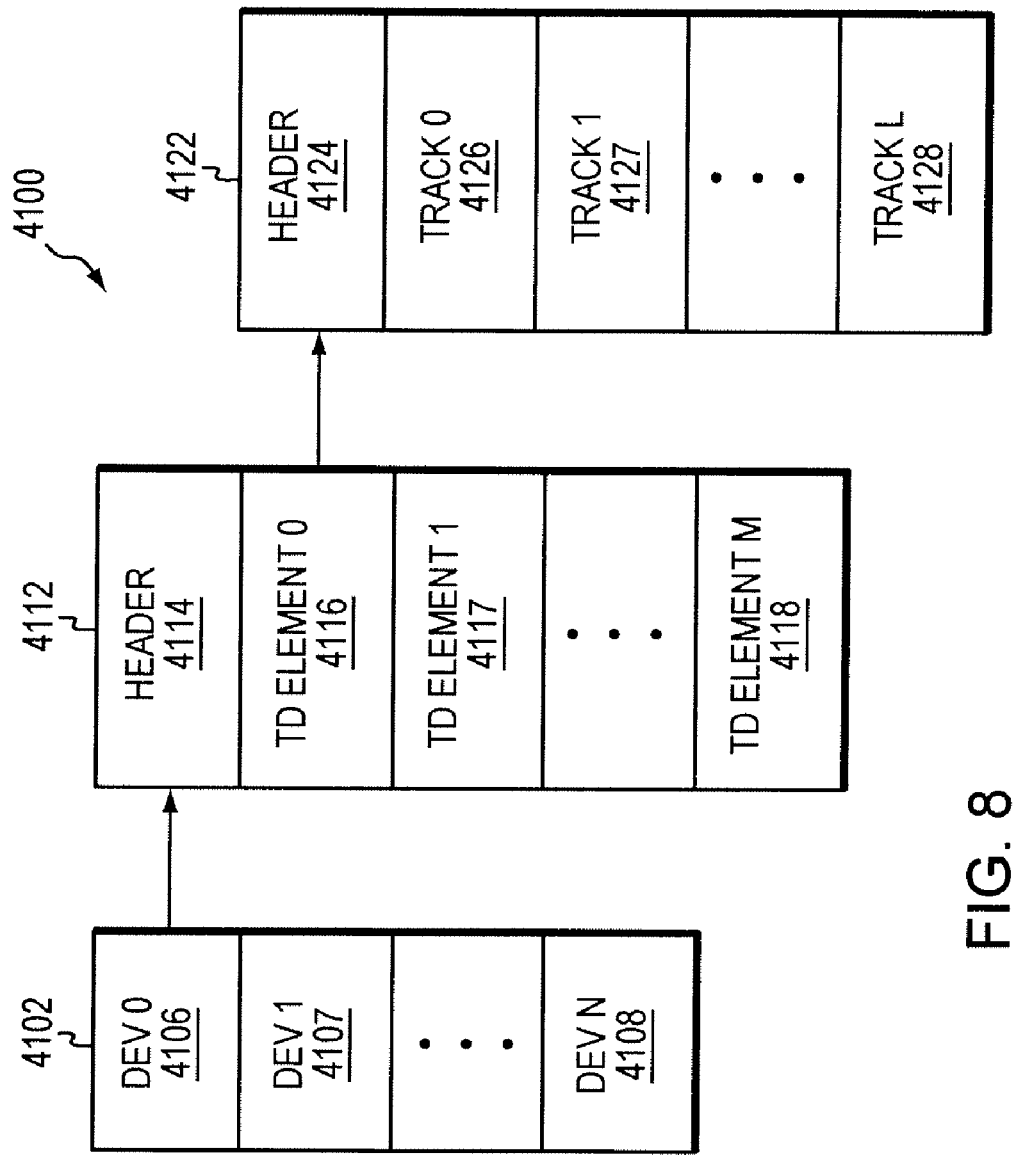
FIGS. 8-9 are diagrams of data structures for use with one or more of the data storage systems.

FIG. 8 is a diagram 4100 illustrating tables that are used to keep track of device information. A first table 4102 corresponds to all of the devices used by a storage device or by an element of a storage device, such as an HA and/or a DA. The table 4102 includes a plurality of logical device (logical volume) entries 4106-4108 that correspond to all the logical devices used by the storage device (or portion of the storage device). The entries in the table 4102 may include information for thin devices, for data devices, for standard logical devices, for virtual devices, for BCV devices, and/or any or all other types of logical devices used in connection with the system described herein.

Each of the entries 4106-4108 of the table 4102 correspond to another table that may contain information for one or more logical volumes, such as thin device logical volumes. For example, the entry 4107 may correspond to a thin device table 4112. The thin device table 4112 may include a header 4114 that contains overhead information, such as information identifying the corresponding thin device, information concerning the last used data device and/or other information including counter information, such as a counter that keeps track of used group entries (described below). The header information, or portions thereof, may be available globally to the storage device 430.

The thin device table 4112 may include one or more group elements 4116-4118, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 4116-4118 (for example, the group element 4116) of the thin device table 4112 may identify a particular one of the data devices 461-467 having a track table 4122 that contains further information, such as a header 4124 having overhead information and a plurality of entries 4126-4128 corresponding to each of the tracks of the particular one of the data devices 461-467. The information in each of the entries 4126-4128 may include a pointer (either direct or indirect) to the physical address on one of the disk drives 442-444 of the storage device 430 (or a remote storage device if the system is so configured) that maps to the logical address(es) of the particular one of the data devices 461-467. Thus, the track table 4122 may be used in connection with mapping logical addresses of the logical devices corresponding to the tables 4102, 4112, 4122 to physical addresses on the disk drives 442-444 of the storage device 430.

In accordance with the metadata management technique, metadata in the form of tables 4102, 4112, 4122 are stored in metadata 445 of SSD set 444A of the storage device 430. In addition, the tables corresponding to particular logical devices accessed by a particular host may be stored (cached) in local memory of the corresponding one of the HA's 432-436. In addition, the RA 448 and/or the DA's 436-438 may also use and locally store (cache) portions of the tables 4102, 4112, 4122. Since the tables are stored in the SSD set, global memory 446 may be reduced in size compared to the size it would need to be to hold the tables and/or may have more of its capacity devoted to other needs.

FIG. 5 is a schematic diagram illustrating a group element 4116 of the thin device table 4112 in connection with an embodiment of the system described herein. The group element 4116 may includes a plurality of entries 4116a-4116f. The entry 4116a may provide group information, such as a group type that indicates whether there has been physical address space allocated for the group. The entry 4116b may include information identifying one (or more) of the data devices 461-467 that correspond to the group (i.e., the one of the data devices 461-467 that contains pointers for physical data for the group). The entry 4116c may include other identifying information for the one of the data devices 461-467, including a speed indicator that identifies, for example, if the data device is associated with a relatively fast access physical storage (disk drive) or a relatively slow access physical storage (disk drive). Other types of designations of data devices are possible (e.g., relatively expensive or inexpensive, RAID protection type, numbered of mirrored copies, etc.). The entry 4116d may be a pointer to a head of the first allocated track for the one of the data devices 461-467 indicated by the data device ID entry 4116b. Alternatively, the entry 4116d may point to header information of the data device track table 4122 immediately prior to the first allocated track. The entry 4116e may identify a cylinder of a first allocated track for the one the data devices 461-467 indicated by the data device ID entry 4116b. The entry 4116f may contain other information corresponding to the group element 4116 and/or the corresponding thin device. In other embodiments, entries of the group table 4116 may identify a range of cylinders of the thin device and a corresponding mapping to map cylinder/track identifiers for the thin device to tracks/cylinders of a corresponding data device. In an embodiment, the size of the group element 4116 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives 442-444. Thus, an access of the logical storage space of the thin device results in either a null pointer (or equivalent) indicating that no corresponding physical storage space has yet been allocated, or results in a reference to a data device which in turn references the underlying physical storage space.

FIG. 6 is a flow diagram 4200 illustrating processing for handling a read of one or more logical tracks of one of the thin devices 471-474 in an embodiment of the system described herein. In a step 4202, an appropriate one of the host adapters 432-434 accesses the SSD set 444A to read the group table 4112 of the one of the thin devices 471-474 corresponding to the logical tracks being read. After the step 4202, at a test step 4204, it is determined whether the logical tracks identified from the group table 4112 corresponds to any of the data devices 461-467 (i.e., if there is physical data corresponding to the logical tracks being read). If there is no corresponding physical data (meaning that no logical track(s) were ever written), then processing proceeds to a step 4206 where error processing is performed, such as returning a NULL value to the host. Other appropriate error processing may be performed at the step 4206. After the step 4206, processing is complete.

If it is determined at the step 4204 that there is physical data corresponding to the logical tracks being read, then processing proceeds to a step 4208 where one or more of the data devices 461-467 associated with the logical tracks being read are identified from the group table 4112. After the step 4208, processing proceeds to a step 4210 where the track table 4122 is read from the identified one or more of the data devices 461-467 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. After the step 4210, processing proceeds to a step 4212 where a request may be sent to one or more disk adapters 436-438 corresponding to disk drives 442-444 that provide the physical storage space associated with the identified one of the data devices 461-467 and corresponding location information. After the step 4212, processing proceeds to a step 4214 where the physical data is read. Note that the data may be stored in a cache or other memory (for example, the memory 446) in connection with being read. In some cases, if the data being read is already in the cache, then the processing at the step 4212 and following steps may not be necessary. Note also that reading the data may include updating any metadata in the SSD set used to provide the processing described herein, such as the time last accessed, the host/user making the request, frequency of use, and/or any other appropriate metric. After the step 4214, processing proceeds to a step 4216 where the data may be received by an appropriate one of the host adapters 432-34 (e.g., by reading the memory 446). After the step 4216, processing is complete.

Figure 11:
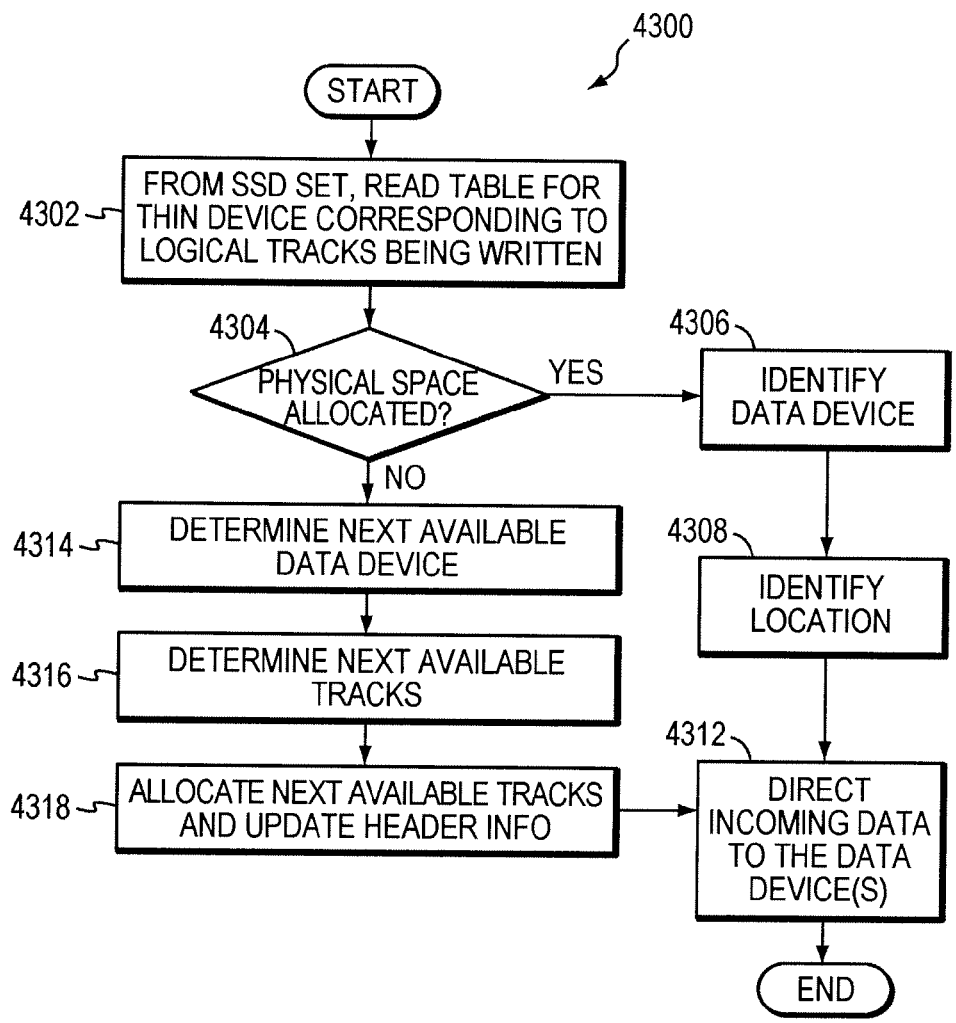

FIG. 11 is a flow diagram 4300 illustrating processing for handling a write of logical track(s) to one or more of the thin device(s) 471-474 in connection with the system described herein. At a step 4302, an appropriate one of the host adapters 432-434 accesses the SSD set to read the group table 4112 of the one of the thin device(s) 471-474 corresponding to the logical tracks being written.

Following the step 4302 is a test step 4304 where it is determined whether physical space had been previously allocated (i.e., in a prior write operation) for the logical tracks being written. If so, then processing proceeds to a step 4306 where the data device that includes the logical tracks is identified. After the step 4306, is a step 4308 where the track table 4122 is read from the identified one or more of the data devices 4614-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. Following the step 4308 processing proceeds to a step 4312 where the data being written is directed to the appropriate physical storage space. The incoming data overwrites the appropriate portion of the data where directed. After the step 4312, processing is complete.

If it is determined at the step 4304 that there is no physical storage that has been allocated for the logical track(s) being written, control transfers from the step 4304 to a step 4314, where a next available data device identifier (i.e., the data device 468) is determined. This information may be obtained from the header 4114 of the device table 4112 in the SSD set. In an embodiment herein, data device identifiers are provided by numbers so that a next available data device identifier is simply one more than a last allocated data device. However, as discussed in more detail elsewhere herein, selection of a data device at the step 4314 may include application of other criteria.

After the step 4314, processing proceeds to a step 4316 where available physical storage space on the disk drives 442-444 is determined. In an embodiment herein, available physical storage space is allocated sequentially from one or more of the disk drives 442-444. Following the step 4316 is a step 4318 where a request may be sent to a disk adapter 436-438 (or possibly the RA 448 and/or the EA 449) to allocate the physical storage space for the write. Also at the step 4318, header info is updated to reflect the newly allocated data device and physical tracks. After the step 4318, processing proceeds to the step 4312, discussed above, where the data being written is directed to the one or more data devices. After the step 4312, processing is complete.

Figure 9:
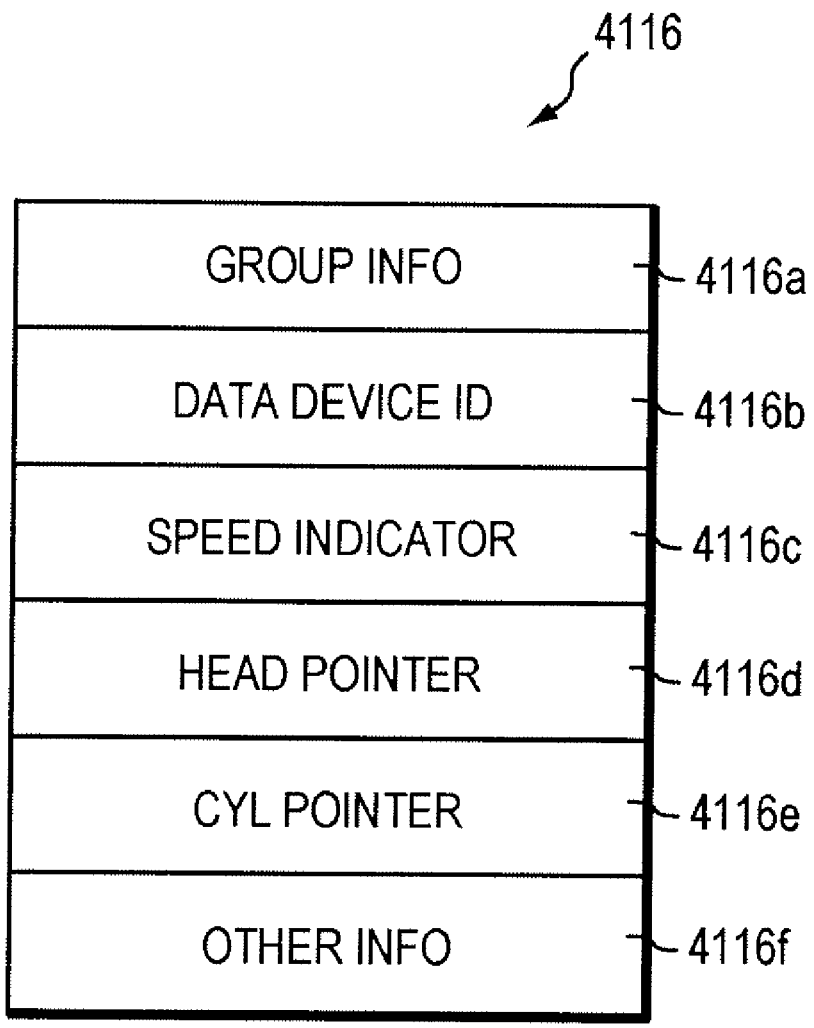
Figure 10:
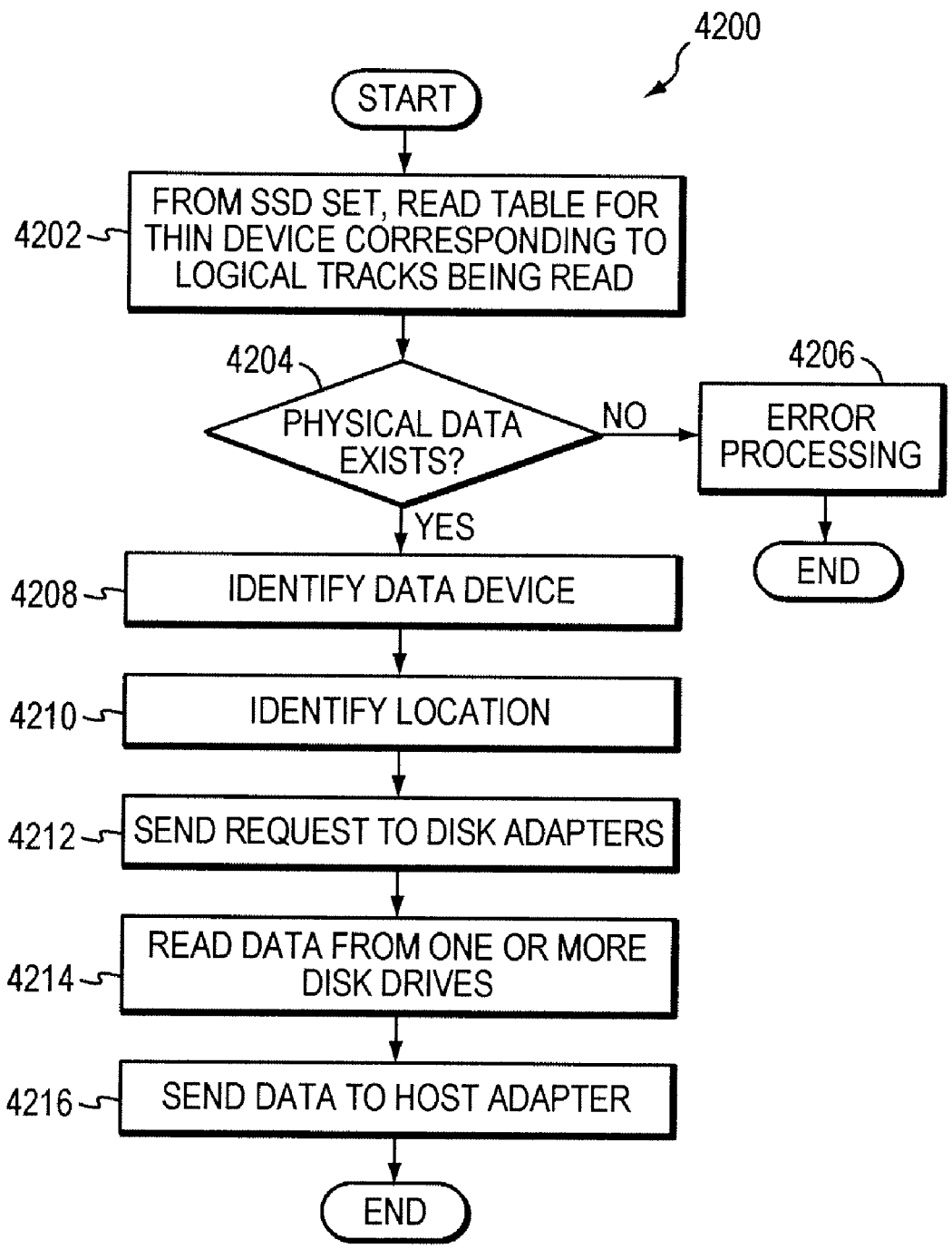
FIGS. 10-11 are flow diagrams of procedures for use with one or more of the data storage systems.

After the read and write processes illustrated in FIGS. 10 and 11, information concerning access of the data, such as access frequency, time of last access or use and/or other characteristics and statistics, may be updated and stored by the system described herein. The updated data access information or other characteristic information of the data and/or any portion of the data may, for example, be stored in the SSD set as an entry in a group element of the thin device table 4112 (for example, the entry 4116*f* of the group element 4116 as shown in FIG. 9). Other implementations for storing and access of the data characteristic information are possible.

In at least some embodiments, the metadata management technique allows much higher performance at a lower cost even despite the fact that the SSD set is an expensive device. For example, in terms of price an SSD is N×FC disk and M×SATA disk, and in terms of performance SSD is n×FC and m×SATA. If the data volumes are L×FC disk, the efficiency of the use is the ratio between the system using SSD and the system using more disks price-wise and achieving less performance: an L+N FC disks system performance is S×less than a system with 1 SSD disk for metadata and L FC disks for data (same system size). This is clear after considering that the size of the metadata of a file system is less than 2% than the total file system size (metadata plus data). In other words, the boost in performance gained by adding the SSD for storing metadata is much more than any performance gain that would be achieved by adding a cost equivalent amount of FC or SATA disks to the system.

In at least one embodiment, the SSD set may be used for keeping fine grain usage statistics, which are another type of metadata. An example of keeping statistics at the file level is the keeping of time last accessed and of time last modified. Statistics can be kept at the subfile and/or block range level as well. These statistics can be used in conjunction with a fine grain mapped storage architecture to enable the storage system to intelligently migrate data, at a fine level of granularity between tiers of storage. However, like the mapping information discussed above, usage statistics kept at a fine grain level generally require enough space that conventionally they need to be paged. Conventionally, the extra Ms (e.g., disk accesses) needed to page the statistics is sufficiently excessive that fine grain storage tiering is generally not practiced. In accordance with the metadata management technique, use of the SSD set to host fine grain statistics metadata helps avoid an excessive adverse performance impact, and therefore helps make practical the keeping of such statistics for fine grain storage tiering implementations.

At least one embodiment may use one or more of the following applications of the metadata management technique.

Flash and logging: a flash storage device such as the SSD set has specific I/O characteristics that can have an impact on overall performance of the device. In the case of at least one type of flash device, random writes are slower than sequential writes, and it is necessary to erase before writes and to wear-level the drive. A flash device offered to emulate a disk (e.g., an SSD) may be configured to hide some of these characteristics, but it can be advantageous to take them into account nonetheless. The kind of I/O generated to do logging is well suited to flash devices, because I/O for logging is mostly writes, the writes are always sequential, and there is usually an area ahead of the writes that is available to be pre-erased. File systems often make use of log-like writes and therefore such writes are excellent candidates for using flash.

Flash and file system journaling: many file systems make use of a log or journal in order to make the file system operations transactional. In the event of a system failure the journal can be read and transactions in the journal may be committed or rolled back. The file system journal is an append only log of information, where new transactions are written to the end of the log in a sequential fashion. When the log reaches the end of the device, it wraps back to the beginning. There is usually a process available to insure that the old entries in the log are not overwritten and thus could be used for pre-erase.

Flash and log-structured file systems: some file systems are constructed entirely as a log. All of the file system data and metadata are written like a log with all writes being constrained to be appends to the log. As the file system fills, some log information needs to be copied forward to insure space is available. This is done with a garbage collection program. While this is well suited to the characteristics of flash it co-locates data and metadata, meaning that the storage of data would need to be in flash as well.

Flash and log-structured metadata: in some file systems, such as DualFS, the file system separates the file system metadata and the data to be stored, and goes a step further and structures the metadata as a log, which makes flash particularly suitable to store the metadata. At the same time the separation of data and metadata allows the use of flash for just the metadata which helps control the cost.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing metadata, the method comprising:
    storing, in a magnetic hard disk set in an object addressable data storage system, data of objects;
    storing, in an SSD set in the object addressable data storage system, metadata for the objects, the metadata including information necessary for determining the locations of the data of the objects in the magnetic hard disk set;
    receiving an open file command, the open file command comprising an encoding identifying the command and the file name of a file to be opened;
    checking a file system cache and prompting a metadata manager to retrieve the metadata for the object associated with the file to be opened from the SSD set; and
    responding to the open file command with a positive response, the positive response including a file ID from the metadata identifying the file.

2. The method of claim 1, wherein the file ID identifies an mode in the metadata.

3. The method of claim 1, wherein the file ID includes an index into an mode file within a block map in the metadata.

4. The method of claim 1, wherein the positive response comprises a device ID comprising an address for storing the file.

5. The method of claim 1, wherein the positive response comprises an access key.

6. The method of claim 1, wherein a file system manager treats the commands of a file access using the metadata as a transaction.

7. The method of claim 1, wherein at least some operations that do not involve accessing object data are executed by use of the metadata in the SSD set without requiring any access to the data on the magnetic hard disk set.

8. The method of claim 1, wherein metadata from the SSD set is cached.

9. The method of claim 1, wherein metadata from the SSD set is served directly out of the SSD set.

10. The method of claim 1, wherein the metadata stored in the SSD set comprises mapping table information.

11. The method of claim 1, wherein the metadata stored in the SSD set comprises fine grained mapping tables.

12. The method of claim 1, wherein the metadata stored in the SSD set comprises fixed metadata and dynamic metadata.

13. The method of claim 1, wherein the metadata stored in the SSD set is used for thin provisioning.

14. The method of claim 1, wherein the metadata stored in the SSD set includes mapping tables that map between virtual objects and physical objects.

15. The method of claim 1, further comprising:
    receiving an external request (I/O) from a host;
    to service the request, accessing the metadata in the SSD set; and
    using the metadata, locating data blocks on the magnetic hard disk set.

16. The method of claim 1, further comprising:
using the metadata to provide an SSD based block-device file system with metadata data separation for logical volume virtualization.

17. The method of claim 1, wherein the SSD set comprises a mirror pair of SSDs containing only the metadata of a block device file system.

18. The method of claim 1, further comprising:
avoiding commingling the data for the object and the metadata for the object on the same logical block device.

19. The method of claim 1, wherein a file system manager accesses the metadata in the SSD set which aids the file system manager in locating the data of the object.

* * * * *